United States Patent
Poole et al.

(10) Patent No.: US 9,613,538 B1
(45) Date of Patent: Apr. 4, 2017

(54) UNMANNED AERIAL VEHICLE ROOFTOP INSPECTION SYSTEM

(71) Applicant: Unmanned Innovation, Inc., San Francisco, CA (US)

(72) Inventors: Alan Jay Poole, San Francisco, CA (US); Mark Patrick Bauer, San Francisco, CA (US); Volkan Gurel, San Francisco, CA (US); Bernard J. Michini, San Francisco, CA (US); Justin Eugene Kuehn, San Francisco, CA (US)

(73) Assignee: UNMANNED INNOVATION, INC., San Francisco, CA (US)

( * ) Notice: Subject to any disclaimer, the term of this patent is extended or adjusted under 35 U.S.C. 154(b) by 0 days.

(21) Appl. No.: 15/068,255

(22) Filed: Mar. 11, 2016

Related U.S. Application Data

(60) Provisional application No. 62/273,746, filed on Dec. 31, 2015, provisional application No. 62/294,881, filed on Feb. 12, 2016.

(51) Int. Cl.
*B64C 39/02* (2006.01)
*G08G 5/00* (2006.01)
(Continued)

(52) U.S. Cl.
CPC ....... *G08G 5/0065* (2013.01); *G06K 9/00637* (2013.01); *G06K 9/00805* (2013.01);
(Continued)

(58) Field of Classification Search
CPC ....... B64C 39/00; B64C 39/02; B64C 39/024; B64C 39/028; B64C 2201/123; B64C 2201/126; B64C 2201/127; B64C 2201/146
(Continued)

(56) References Cited

U.S. PATENT DOCUMENTS 4,818,990 A 4/1989 Fernandes
5,575,438 A 11/1996 McGonigle et al.
(Continued)

FOREIGN PATENT DOCUMENTS

WO WO 2008/048356 A2 4/2008

OTHER PUBLICATIONS

U.S. Appl. No. 15/059,154, filed Mar. 2, 2016, Bethke et al.
(Continued)

*Primary Examiner* — Stephen Holwerda
(74) *Attorney, Agent, or Firm* — Knobbe Martens Olson & Bear LLP

(57) ABSTRACT

Methods, systems, and apparatus, including computer programs encoded on computer storage media, for an unmanned aerial system inspection system. One of the methods is performed by a UAV and includes receiving, by the UAV, flight information describing a job to perform an inspection of a rooftop. A particular altitude is ascended to, and an inspection of the rooftop is performed including obtaining sensor information describing the rooftop. Location information identifying a damaged area of the rooftop is received. The damaged area of the rooftop is traveled to. An inspection of the damaged area of the rooftop is performed including obtaining detailed sensor information describing the damaged area. A safe landing location is traveled to.

30 Claims, 12 Drawing Sheets

(51) Int. Cl.
*G08G 5/02* (2006.01)
*G06K 9/00* (2006.01)

(52) U.S. Cl.
CPC ......... *G08G 5/0034* (2013.01); *G08G 5/0069* (2013.01); *G08G 5/025* (2013.01)

(58) Field of Classification Search
USPC .. 701/2, 3, 4, 5, 6, 7, 11; 700/257, 258, 259
See application file for complete search history.

(56) References Cited

U.S. PATENT DOCUMENTS

| | | | |
|---|---|---|---|
| 7,400,384 | B1 | 7/2008 | Evans et al. |
| 7,496,226 | B2 | 2/2009 | Negahdaripour et al. |
| 7,872,794 | B1 | 1/2011 | Minelly et al. |
| 7,929,125 | B2 | 4/2011 | Koehler et al. |
| 8,060,270 | B2 | 11/2011 | Vian et al. |
| 8,207,484 | B1 | 6/2012 | Williams |
| 8,212,995 | B2 | 7/2012 | Koehler et al. |
| 8,346,578 | B1 | 1/2013 | Hopkins et al. |
| 8,818,572 | B1 | 8/2014 | Tofte et al. |
| 8,830,485 | B2 | 9/2014 | Woloschyn |
| 8,872,818 | B2 | 10/2014 | Freeman et al. |
| 8,874,283 | B1 | 10/2014 | Cavote |
| 8,896,819 | B2 | 11/2014 | Schumann et al. |
| 8,997,362 | B2 | 4/2015 | Briggs et al. |
| 9,009,000 | B2 | 4/2015 | York et al. |
| 9,129,355 | B1 | 9/2015 | Harvey et al. |
| 9,152,863 | B1 * | 10/2015 | Grant ...................... G06Q 40/08 |
| 9,162,753 | B1 * | 10/2015 | Panto ...................... B64C 19/00 |
| 9,256,225 | B2 | 2/2016 | Downey et al. |
| 9,256,994 | B2 | 2/2016 | Downey et al. |
| 9,273,981 | B1 | 3/2016 | Downey et al. |
| 9,310,221 | B1 | 4/2016 | Downey et al. |
| 9,329,599 | B1 | 5/2016 | Sun et al. |
| 9,340,283 | B1 | 5/2016 | Downey et al. |
| 9,403,593 | B2 | 8/2016 | Downey et al. |
| 9,406,237 | B2 | 8/2016 | Downey et al. |
| 2008/0059068 | A1 * | 3/2008 | Strelow ................ G05D 1/0246 701/469 |
| 2009/0265193 | A1 | 10/2009 | Collins et al. |
| 2010/0012776 | A1 | 1/2010 | Hursig et al. |
| 2010/0211302 | A1 * | 8/2010 | Ribbe .................. G08G 5/0039 701/120 |
| 2010/0215212 | A1 * | 8/2010 | Flakes, Jr. ............ G01M 5/0025 382/100 |
| 2010/0228418 | A1 * | 9/2010 | Whitlow ............... G11B 27/105 701/25 |
| 2010/0268409 | A1 * | 10/2010 | Vian ....................... G05D 1/104 701/24 |
| 2010/0286859 | A1 * | 11/2010 | Feigh ................... G05D 1/0044 701/25 |
| 2011/0270470 | A1 | 11/2011 | Svoboda et al. |
| 2012/0170797 | A1 * | 7/2012 | Pershing ................ G06Q 30/02 382/100 |
| 2012/0197461 | A1 | 8/2012 | Barrows et al. |
| 2012/0250010 | A1 | 10/2012 | Hannay |
| 2012/0271461 | A1 | 10/2012 | Spata |
| 2013/0206915 | A1 | 8/2013 | Desaulniers |
| 2013/0216089 | A1 | 8/2013 | Chen et al. |
| 2013/0238168 | A1 | 9/2013 | Reyes |
| 2014/0061376 | A1 | 3/2014 | Fisher et al. |
| 2014/0259549 | A1 | 9/2014 | Freeman et al. |
| 2014/0267627 | A1 * | 9/2014 | Freeman ................ G01S 17/023 348/47 |
| 2014/0277842 | A1 | 9/2014 | Tofte et al. |
| 2014/0316614 | A1 | 10/2014 | Newman |
| 2014/0316616 | A1 * | 10/2014 | Kugelmass ............ G05D 1/101 701/8 |
| 2014/0324405 | A1 * | 10/2014 | Plummer ............... G06Q 40/00 703/6 |
| 2014/0336928 | A1 | 11/2014 | Scott |
| 2015/0325064 | A1 | 11/2015 | Downey et al. |
| 2015/0343644 | A1 | 12/2015 | Slawinski et al. |
| 2015/0344136 | A1 | 12/2015 | Dahlstrom |
| 2015/0377405 | A1 | 12/2015 | Down et al. |
| 2016/0004795 | A1 | 1/2016 | Novak |
| 2016/0176542 | A1 * | 6/2016 | Wilkins ................ A01M 27/00 348/144 |

OTHER PUBLICATIONS

U.S. Appl. No. 15/068,272, filed Mar. 11, 2016, Bauer et al.
U.S. Appl. No. 15/068,327, filed Mar. 11, 2016, Richman et al.
U.S. Appl. No. 15/068,292, filed Mar. 11, 2016, Michini et al.
Airsight Australia web page, "Onesteel Wire Rope Plant", http://www.airsightaustralia.com.au/onesteel-wire-rope-plan/ , Internet Archive Date Aug. 6, 2015, 3 pages.
Airsight Australia, "Case Study: Onesteel Wire Rope Plant—Mayfield NSW, Industrial roof inspections using unmanned aircraft systems (UAS)", Aug. 2014 (Google date: Sep. 1, 2014), 1 page, http://www.airsightaustralia.com.au/wp-content/uploads/2014/08/Case-Study-Industrial-roof-inspections-Onesteel1.pdf.
Bonnin-Pascual et al., "Semi-autonomous visual inspection of vessels assisted by an unmanned micro aerial vehicle", 2012 IEEE/RSJ International Conference on Intelligent Robots and Systems, Oct. 7-12, 2012, Vilamoura, Algarve Portugal, pp. 3955.
Emmerson, Roy, "Bird's eye view", RICS Building Conservation Journal, Oct./Nov. 2015, p. 32.
Kendoul et al., "An adaptive vision-based autopilot for mini flying machines guidance, navigation and control", Autonomous Robots, vol. 27, Issue 3, Oct. 2009, pp. 165-188.
Merz, et al., "Beyond visual range obstacle avoidance and infrastructure inspection by autonomous helicopter", 2011 IEEE/RSJ International Conference on Intelligent Robots and Systems, Sep. 25-30, 2011, San Francisco, CA p. 4953.
Ouellette & Associates, "Drone use in claims adjusting", Jun. 1, 2015, 3 pages, http://www.indianaclaimsservice.com/drone-use-claims-adjusting/.
Russell, Lisa, "Up and away", The Construction Index (U.K.) Feb. 5, 2015, 14 pages, http://www.theconstructionindex.co.uk/news/view/up-and-away.
Office Action Issued in U.S. Appl. No. 15/059,154, dated May 16, 2016, 16 pages.
Office Action Issued in U.S. Appl. No. 15/068,272, dated Jun. 17, 2016, 34 pages.
Office Action Issued in U.S. Appl. No. 15/068,327, dated Jul. 25, 2016, 19 pages.
Office Action Issued in U.S. Appl. No. 15/068,292, dated Jun. 14, 2016, 27 pages.

* cited by examiner

UNMANNED AERIAL VEHICLE ROOFTOP INSPECTION SYSTEM

BACKGROUND

Inspecting properties (e.g., apartment buildings, office buildings, single family homes) for damage (e.g., weather damage), or other reasons, can include significant time investments by personnel trained to perform the inspection. Additionally, typical inspection procedures involve physically climbing onto roofs and ledges, incurring significant risks of both inspection personnel injury and damage to the property itself. Subsequently, companies involved in inspection generally need to devote substantial time training personnel, and subsequently ensuring that the personnel follow proper safety and governmental procedures.

SUMMARY

Particular embodiments of the subject matter described in this specification can be implemented so as to realize one or more of the following advantages. Utilizing an unmanned aerial vehicle (UAV), an entity (e.g., a company, a governmental entity) can schedule inspection jobs, and provide the jobs intelligently to one or more UAVs to perform inspections of potentially damaged properties (e.g., a home, an apartment, an office building, a retail establishment, etc.). By intelligently scheduling jobs, a large area can be inspected using UAV(s), which reduces the overall time of inspection, and enables property to be maintained in safer conditions. Furthermore, by enabling an operator to intelligently define a safe flight plan of a UAV, and enable the UAV to follow the flight plan and intelligently react to contingencies, the risk of harm to the UAV or damage to surrounding people and property can be greatly reduced.

In general, one innovative aspect of the subject matter described in this specification can be embodied in methods that include the actions of receiving, by the UAV, flight information describing a job to perform an inspection of a rooftop; ascending to at least a particular altitude, and performing an inspection of the rooftop including obtaining sensor information describing the rooftop; subsequent to inspecting the rooftop, receiving location information identifying a damaged area of the rooftop; traveling to the damaged area of the rooftop; performing an inspection of the damaged area of the rooftop including obtaining detailed sensor information describing the damaged area; and traveling to a safe landing location.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
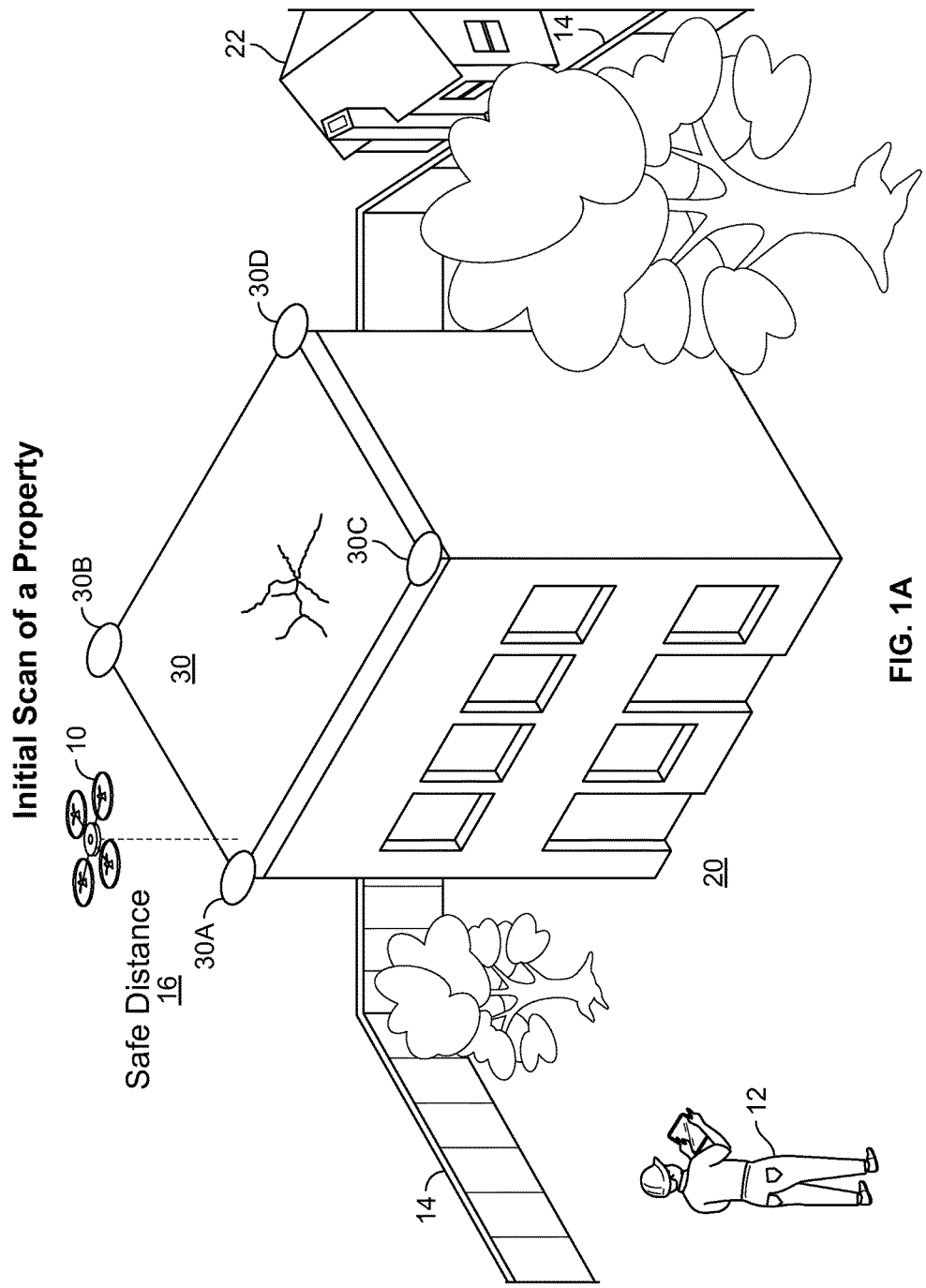
FIG. 1A illustrates an example of an Unmanned Aerial Vehicle (UAV) performing a first flight to perform rooftop damage inspection of a property.

This specification describes systems and methods to perform inspections of properties for damage (e.g., weather damage, structural damage, and so on) using an Unmanned Aerial Vehicle (UAV). While the specification describes determining damage of rooftops as an example, the system and methods can be utilized to determine damage to any portion of a property (e.g., home, building, apartment, multi-unit home, factory, bridge, power plant, and so on). In this specification, UAVs include any unmanned aerial vehicles, such as drones, unpiloted aerial vehicles, remotely piloted aircraft, unmanned aircraft systems, any aircraft covered under Circular 328 AN/190 classified by the International Civil Aviation Organization, and so on. For example, the UAV may be in the form of a single or multi-rotor copter (e.g., a quad-copter) or a fixed wing aircraft. In addition, certain aspects of the disclosure can be utilized with other types of unmanned vehicles (e.g., wheeled, tracked, and/or water vehicles).

A described cloud system can generate information describing one or more jobs to be performed by a UAV, optionally in concert with an operator using a user device (such as a ground control system, including a laptop, tablet, and so on) that is in communication with the UAV. In this specification, a job is any task to perform an inspection of property for damage, and the cloud system can intelligently batch jobs together such that a same UAV can inspect a grouping of properties in a same geographical area (e.g., a city block, a suburban area), thereby reducing the number of separate flights needed, and reducing energy consumption that would otherwise be needed to repeatedly place the UAV in the geographical area. A job, or job information, can be provided to a UAV, or user device, with sufficient information to enable the UAV, and/or user device, to implement the job, and can also be known as a flight plan. The cloud system can receive user input on one or more user interfaces generated by the cloud system, such as in an interactive document (e.g., a web page) provided for presentation on a user device. A user of the cloud system can provide information describing one or more properties to be inspected (e.g., an address of each property), and the cloud system can determine information associated with one or more jobs to inspect the properties.

To determine information associated with a job, the cloud system can access property information for an input property (e.g., from public and/or private databases via an application program interface (API)), and determine a property boundary for the property. The property information received by the cloud system can be of various data types, for example, parcel polygons, vector, rasterized, shape files, or other data types. For the particular property, the cloud system may create the geofence envelope based on the property shape data. The various data types ideally would have geolocation and/or coordinate information, such as latitudinal/longitudinal points for use in orienting and creating the geofence envelope. The geofence envelope may be identical in shape to the property boundary. Optionally, the boundary of the property may be reduced in size. For example, the property boundary may be reduced in size by a set distance, for example 5 meters, towards a centroid of the property. Reduction of the geofence envelope creates a buffer zone. The buffer zone may help avoid an unintentional flyover of an adjacent property boundary. Optionally, the cloud system may display an area with parcel polygonal data. An interface of the cloud system may then receive a selection of one or more parcels. The cloud system then can use the selections to create one or more jobs, and multiple geofence envelopes. For the multiple parcels, the UAV would be taken to each parcel property, and the operator would conduct each job with the UAV for the respective parcel property. Additionally, the UAV can conduct multiple jobs for separate parcel properties if the parcels are close enough in proximity, and the UAV has sufficient fuel or battery power to conduct the multiple jobs. The cloud system can then determine a geofence envelope that is limited or substantially limited by the property boundary, ensuring that a UAV is to remain within the property boundary. In this specification, a geofence envelope is a virtual perimeter, or volume of space, for a real-world geographic area, or volume. Therefore, a 2D or 3D geofence envelope limits locations of a UAV to the real-world geographic area or volume, and a UAV can include one or more systems to receive a specified geofence, and enforce the geofence.

Similarly, the cloud system can determine, or obtain information identifying, a boundary of the rooftop of the property to be inspected. For instance, a user of the cloud system can access imagery (e.g., satellite imagery, or images obtained from prior jobs) of the property to be inspected (e.g., from a public or private data store via an API), and can interact with the imagery to indicate the boundary of the rooftop. As an example, the user can select corners of the rooftop to describe a polygon that encompasses the rooftop. In another instance, the cloud system can determine (e.g., using machine vision techniques to cluster potential rooftops found in the imagery, and using machine learning algorithms to correctly label the actual rooftop) the boundary of the rooftop. Furthermore, optionally if the property has previously been inspected, the cloud system can access stored information describing the rooftop boundary determined in the prior inspection. As will be described, the boundary of the rooftop may be utilized to inform a flight pattern of a UAV.

The cloud system can access from one or more sources of weather information, including weather forecasts for an upcoming period of time, solar light models, and configuration information associated with one or more UAVs, to determine an optimal UAV and time period for the UAV to perform a job. For instance, the cloud system can determine that due to weather effects (e.g., rain) on an upcoming day, the job is better scheduled on a day with sun. Additionally, the cloud system can determine that sensors included a UAV will have better performance with particular weather (e.g., electro-optic imaging sensors can perform better at noon on a sunny day, as image contrast will be maximized, and shadows will be minimized).

For autonomous flight of the UAV, a flight plan may be created and transmitted to the UAV from the cloud system or a user device (described below). The flight plan instructs the UAV with regard to autonomous flight along a particular flight path in three-dimensional space. The flight plan includes a series of connected waypoints that define where the UAV should fly and what actions the UAV should take during a particular flight. The UAV may have an autopilot flight module operating on a UAV computer system that uses the flight plan to automatically pilot the UAV.

Additionally, flight plan contingencies may be created using the cloud system or user device. A flight plan contingency instructs the UAV to perform an action or operation based on certain contingency criteria. For example, contingency criteria may be the detection of a low battery or fuel state, or malfunctioning of an onboard sensor, motor, or a deviation from the flight plan, or crossing over a geofence boundary by the UAV. Other contingency events may include ground control system power or system failure, lost or degraded telemetry link to/from the UAV and ground control system, stuck motor, GPS failure or degradation, autopilot sensor failure (e.g. airspeed, barometer, magnetometer, IMU), control surface failure, gear failure, parachute deployment failure, adverse weather conditions, nearby aircraft in airspace, vehicle vibration, aircraft flyaway).

A UAV computer system, or optionally a user device of an operator, can receive information describing the job, and perform the associated inspection (e.g., the user device can provide information describing the job to the UAV, or the UAV can receive information from the cloud system and be brought by the operator to the property). The user device may receive flight plans from the cloud system for transmission to the UAV. The user device also allows for manual override of a UAV operating in an auto-pilot mode. The user device may transmit a flight plan to the UAV either via a wireless or tethered connection. Ideally, the user device is a mobile device, such a laptop, mobile phone, tablet device, with radios for data communication. After, or while, performing the inspection, the UAV can provide images, and other sensor information, to the cloud system or user device. Ultimately, an interactive report can be generated (e.g., by the cloud system, user device, or UAV) that includes summary data associated with the job, which can optionally include a graphical representation of the property and/or rooftop with damaged areas identified (e.g., highlighted), the types of damage detected, and which provides access to the raw image and sensor information (e.g., a user can select a damaged area and access associated image and sensor information). Sensors can include visible and/or non-visible light cameras, RF sensors, chemical sensors, sound sensors, spectrometers, magnetometers, radiometers, wind sensors, ambient light sensors, barometers, temperature sensors, thermal imagers, range sensors, and/or other sensors, and so on. The UAV can store the real-world information along with metadata (e.g., time information associated with each activation, position and attitude data of the UAV, distance of the UAV from the structure, wind information, ambient light information, and so on). In this specification, real-world information, or sensor information, includes any measurement, reading, image, audio, and so on obtained from a sensor that describes, characterizes, measures, and so on, a real-world area.

As described below FIGS. 1A-1B, optionally the inspection can be performed in multiple steps, an initial operation during which a UAV can travel over the property and obtain sensor information (e.g., images), and a subsequent operation during which the UAV can receive (e.g., from an operator using a user device such as a ground control system) indications of specific locations of damage or likely damage on the rooftop, and can descend over each location to obtain detailed sensor information of the location. Interacting with a user interface of the user device, an operator can identify locations of damage or likely damage after the user device receives the sensor information from the initial flight operation, and the identified locations can be provided to the UAV to effect the subsequent operation.

Optionally, the initial flight operation can be performed with a first sensor included with the UAV (e.g. a camera with a wide-angle lens, such as an effective full-frame focal length of 16 mm, 20 mm, 24 mm, 35 mm). The subsequent flight operation can be performed with a second sensor included in the UAV (e.g., a camera with a longer focal length, such as 50 mm, 85 mm, 125 mm). As will be described, the initial flight operation can benefit from a wide-angle lens (e.g., the UAV can capture a wider area, and also obtain more of the sides of properties which can be used when generating 3D models of the property). The subsequent flight operation can benefit from a longer focal length (e.g., to obtain close detail of a damaged area without having to descend close to the damaged area).

FIG. 1A illustrates an example of an Unmanned Aerial Vehicle (UAV) 10 performing a first automated flight plan to perform rooftop damage inspection of a property 20. The UAV 10 computer system has received information describing the property 20, including a property boundary 14, and a boundary of the rooftop 30 to be inspected (e.g., corners 30A-30D of a polygon encompassing the rooftop).

The UAV 10 may be configured to travel (e.g., flying) at a safe distance or height 16 (e.g., above ground level altitude, or mean sea level altitude) over the rooftop 30, with the safe distance indicated by the operator 12 using the ground control system as being a distance at which no obstructions can interfere with the UAV 10 as it travels within the geofence property boundary 14. Optionally, the ground control system or a cloud-based system can determine the safe distance (e.g., using imagery or 3D models of the property 20). For example, the 3D models may be 3D polygonal data models with dimensions of the property 20. The ground control system or UAV determine based on the height of the property, and any structures of the property, a safe distance to fly over the property. The distance may be a predetermined distance such as 3 meters, or a variable distance. The UAV 10 travels over the rooftop 30 at the safe distance 16 according to a flight pattern, which can be a zig-zag pattern (e.g., the UAV can travel from corner 30A to corner 30B, turn towards corner 30D, travel back down towards corner 30B shifted over by a particular distance, and repeat), or the flight pattern can be that of a different flight pattern (e.g., a flight pattern in which the rooftop 30 is traversed in slightly overlapping concentric circles, as similar to an ice resurfacer). The specific flight pattern of the UAV 10 can depend on configuration information of the UAV, for instance a fixed-wing UAV can require a greater distance to turn and thus the different pattern can be preferred. The UAV receives the flight pattern from the ground control system of the cloud-based system. The UAV uses the flight pattern to fly the pattern in an autopilot mode.

The flight pattern of the UAV 10 (e.g., a number of times the UAV 10 is required to turn) can depend on a size of the rooftop 30 (e.g., a larger rooftop can require additional turns) and the UAV configuration information (e.g., a camera included in the UAV 10 with a long focal length can require more turns as the camera has less field of view than a longer focal length camera). As will be described, the cloud system, the user device, or the UAV can determine the flight path for the inspection.

In the example of FIG. 1A, the UAV 10 is shown conducting an automated flight plan over the rooftop 30 while activating sensors included with the UAV 10. The UAV 10 can activate the sensors periodically (e.g., after traveling a threshold distance, such as ½ meter, 1 meter, 2 meters, or after a threshold time period, such as ½ second, 1 second), or can capture sensor information continuously (e.g., a camera can record video, such as 60 frames per second video). Upon the UAV's 10 completion of traversing the rooftop 30, the UAV can provide the obtained sensor information (e.g., images) to the operator for review (e.g., on a laptop, tablet, wearable computer, and so on) through a wired, or wireless connection (e.g., BLUETOOTH, 4G, LTE, Wi-Fi, and so on). Optionally, the UAV 10 can provide the sensor information to the operator 12 via the user device as it obtains the sensor information (e.g., the UAV can provide the sensor information in substantially real-time). The sensor information also may be stored onto a removable storage card used by the sensor, or as configured, from the UAV's onboard processing system.

As the UAV 10 conducts the flight plan, the user device of the operator 12 can present a graphical representation of the progress of the UAV 10. For instance, the user device can present imagery (e.g., satellite imagery) of the property 20 along with a representation of the flight pattern the UAV 10 is to follow. As an example, the representation of the flight pattern can include waypoints the UAV 10 is to navigate to, with each waypoint connected by a line, arrow, or other connecting representation. The UAV 10 can provide geospatial location information to the user device, and the user device can update a representation of the UAV 10 as it travels. Optionally, as the UAV 10 travels and captures sensor information (e.g., digital images), the user device can include a bounding quadrilateral, or other shape, around a representation of the UAV 10, which represents a field of view being captured by the UAV 10 in sensor information (e.g., digital images), with for example, the field of view being an area of the property 20 included in the sensor information (e.g., based off capabilities of the camera, such as focal length, sensor resolution and size, lens aperture, and so on). For instance, as illustrated in FIG. 10B, a representation 1056 of the UAV 10 is traveling to a particular waypoint (e.g., waypoint A), and includes a quadrilateral 1058 surrounding the representation 1056. The quadrilateral 1058 tracks the movement of the UAV 10, and can be modified as the UAV 10 rotates (e.g., rotation in roll, yaw, pitch axes), shifts forward as the UAV 10 shifts forward, and so on. The quadrilateral 1058 can be determined from a determined field of view of a sensor (e.g., camera) with respect to the UAV 10s position (e.g., height, latitude and longitude) and attitude information. The field of view can be toggled on and off by the operator 12, and optionally each quadrilateral captured by the UAV's 10 sensor can be highlighted, colored, shaded, and so on, to indicate that the portion of the property 20 has been captured in sensor information (e.g., digital imagery). In this way, the operator 12 can monitor the progress of the UAV 10, and ensure that the entirety of the rooftop 30 is captured in imagery.

The UAV's onboard processing system may detect sudden shifts or movement of the UAV, for example due to a sudden gust of wind. The onboard processing system may detect output of UAV accelerometers and/or UAV rotational rate gyros. If a threshold magnitude level is detected when an image is taken by the UAV, then the UAV may be configured or programmed to retake the image. The UAV processing system may delete the initial image, or the user device may receive log data from the UAV identifying the second image as the preferred image to use when constructing a mosaic image of the rooftop 30.

A UAV configured for streaming of images to the user device may receive a command from the user device to retake an image. For example, as images are received by the user device, the user device may display the image. Quality information about the image may be determined by sharpness measurements of the image. For instance, a frequency domain analysis of the image can be performed, and a lack of high frequencies can be indicative of a lack of focus (e.g., compared to an expected inclusion of high frequencies for the image). Additionally, a laplacian kernel can be convolved with the image (e.g., in the spatial domain) and the result can be used to determine blurriness of the image (e.g., intensity values of pixels within a threshold distance can be compared, and a blurry image can have a lack of comparisons greater than a threshold). Additional quality information can include sufficient overlap with neighboring images, brightness measurements, exposure measurements, contrast measurements, and so on. The user device may automatically transmit instructions to the UAV to retake an image at a given waypoint if the image fails to meet an image quality threshold. Optionally, the UAV may have onboard GPU processing capabilities. The UAV may after taking an image, move into a holding position, and the UAV onboard processing system may analyze the image. If the onboard processing system determines that an image does not meet a threshold quality, the UAV then retakes another picture. The UAV processing system reruns the image quality review process, and then continues with the flight plan if the image passes the quality threshold.

The operator 12 can review the received sensor information on one or more user interfaces presented on the operator's 12 user device. For instance, the user device can execute an application that is in communication with the UAV 10, and can present sensor information to the operator for review. The operator's 12 user device can execute software (e.g., mosaicking software, photogrammetry software) that can combine (e.g., stitch together) the received sensor information, and geo-rectify the sensor information to obtain, for instance, a continuous image of the rooftop 30 mapped to a real-world coordinate frame. Optionally, the received sensor information can be used to generate a 3D model of the property 20 (e.g., the user device can generate the 3D model, or the user device can provide the sensor information to the cloud system and receive information describing a 3D model). Images of the rooftop from an initial flight photo survey can be stitched together, and converted into an image map layer showing the rooftop, and then used for subsequent flight planning of a subsequent photo point survey.

Optionally, for the initial flight photo survey, the flight plan may include a waypoint that is designated about the center of the property, or about the center of a building to be inspected. Ideally, the waypoint is set at an altitude high enough, for example 45-60 meters above the ground so that the entire building or structure will be in the field of view of the camera. At this waypoint, the UAV will take one or more photos of the property, or building. One of these "central" photos may be used as described below to aid in the identification of potentially damaged areas of the rooftop, or be used to assist with visual odometry. That is, the central photo can include the entirety of the property, building (e.g., rooftop) or structure being imaged, or the photos can each include a portion of the property, building, or structure, being imaged.

Once the user device imports the data from the first flight, the operator may validate the quality of that data before the user device begins stitching the images together (in the case of multiple images being taken). A user interface of the user device, may provide viewing of each of the individual images such that the user may visually inspect the images. Optionally, the operator can interact with the user device to indicate that the image is problematic (e.g., the user device can present selectable options, the operator can swipe left or right on an image, the operator can tap or double tap an image, the operator can verbally describe the problem, and so on). Also, images may be marked automatically as potentially problematic, for example the user device can present potentially problematic images to the operator for review (e.g., based off one or more image quality scores being less than a threshold). An image quality score may be assigned to each of the images based on evaluation of the image by evaluating the generated stitched mosaic image for continuity (e.g., image features properly segue between images), sufficient overlap of the image with another image, measures of image distortion, measures of geographic location error (e.g., a measure describing an accuracy of the location coordinates, such as GPS, associated with the image, which can be determined from a field of view included in the image in comparison to other images and/or estimated fields of view for the location). Also, a composite image quality score may be calculated by determining a measure of central tendency (e.g., a mean) of the above image quality scores, a weighted average of the image quality scores, a determining of the minimum and maximum of all image quality scores, and so on. The user device may indicate that another photo survey is necessary if the overall composite score reaches a threshold number, or if there are a predetermined number of images that are potentially problematic (e.g., as identified by the operator or from the image quality scores). The user device may then use photos from the previous flight to generate a quick-stitch of the roof-top.

A flight plan for a subsequent flight for a photo survey may be created with the user device. To expedite the creation of the flight plan, information from the first job, or flight plan may be used. For example, for the subsequent flight plan for a photo point survey, the flight plan may reuse the same takeoff position, landing position, geofence, contingencies and initial safe altitude from the first flight plan.

The operator 12 can interact with the user device to indicate locations on the rooftop 30 that are determined, by the operator 12, to be potentially damaged. The user device displays the central image, or stitched-image, or separate individual images. The images may be geo-rectified so that for indicated locations, a geospatial reference location may be identified. For instance, the user device can receive a touch selection, mouse selection, or by a pen-input device, by an operator 12 (e.g., a location on the rooftop 30 can be selected on a touch screen of the user device), and the user device can store information identifying the selected portion (e.g., the image area, and associated geospatial position (e.g., geospatial reference), such as global positioning system (GPS) longitude/latitude coordinates. As will be described with respect to FIG. 1B, the UAV 10 can receive a new flight plan with the identified damaged locations as waypoints and obtain detailed sensor information of each location.

A flight plan for a subsequent flight for a photo survey may be created with the user device. To expedite the creation of the flight plan, information from the first job, or flight plan may be used. For example, for the subsequent flight plan for a photo point survey, the flight plan may reuse the same takeoff position, landing position, geofence, contingencies and initial safe altitude from the first flight plan.

The operator 12 can interact with the user device to set a ground sampling distance (GSD) for each of the photos for the identified potentially damaged locations individually, as a group, or as a whole for all of the potentially damaged locations. The GSD indicates an acceptable number of number of image pixels/distance (e.g., meter), ensuring that captured images include sufficient detail. To ensure that images are captured with sufficient detail indicated by the GSD, the user device can determine a particular altitude (e.g., an inspection altitude) above an object or surface being imaged that will provide captured imagery with sufficient detail. The particular altitude can therefore be based off configuration information of included cameras (e.g., a number of pixels, resolution, and so on, of a sensor included in a camera of the UAV), and indicates a minimum altitude above an object, or surface, being imaged to capture images with sufficient detail to satisfy the GSD. A desired GSD for each of the individual photos taken during the point inspection can be based on a specific distance from the roof. The UAV computer system may determine this distance from the roof top while in flight via one or more distance measuring devices, such as onboard Lidar, Leddar, sonar or other measuring device used by the UAV. For the new flight plan, the user devices uses geospatial waypoints that are based on the selected damaged locations with an associated altitude, or a distance from the rooftop.

For the new flight plan, the operator 12 may interact with the user device to set a safe altitude that the UAV will ascend to after each point inspection photo has been taken of a selected damaged location. When the UAV reaches a waypoint for an identified damaged location, the UAV will descend to a distance related to the GSD, and then take a picture of the identified damaged area. The UAV will then ascend to the safe altitude and then move to the next waypoint for an identified damaged location. An initial safe altitude used for the first flight plan may be automatically set as the safe altitude for the second flight plan. The safe altitude, however, should not exceed the ceiling of the geofence property boundary 14. Ideally, a buffer zone from the ceiling, for example 10 meters, may be used to avoid unintentional geofence crossing due to altitude measurement sensor errors.

The operator 12 may interact with the user device to set a waypoint transition speed, or the user device may automatically calculate or configure waypoint transition speeds. The waypoint transition speed may be set such that the autopilot maneuvers the UAV from each identified damaged location to the next at a safe, but efficient transition speed. The waypoint transition speed may be set as a fixed value, such as 1.5 meters per second, or a variable speed based on the distance of one waypoint to the next waypoint. For example, the waypoint transition speed, may be set to a higher speed for waypoints that are farther apart, and a lower speed for waypoint that are closer apart. Also, the waypoint transition speeds can be set as function of the useful battery life, or flight time of the UAV.

Optionally, for any flight plan (independent of damage location determination) an action for a waypoint may be set for determining the slope of a rooftop 12. In this case, for a slope determination waypoint, the UAV may descend at the waypoint to a height above a rooftop 12. The UAV then may move in a pattern while staying at a constant height (such as a circle, cross, square) during which the UAV computer system is capturing the distance (using Lidar, Leddar, or Sonar measurements) from the UAV to the surface of the rooftop 12. The slope of the rooftop 12 at the particular waypoint then can be determined by the respective locations and heights recorded for the positions. Also for a waypoint for a damaged location, the slope for the respective portion of the rooftop 12 may be determined. Also, the user device or cloud system may automatically include waypoints for determine the slope of one or more rooftop 12 sections of a structure. For instance, utilizing property information describing the property 20, information describing directionality of the property 20 can be determined, and utilized to determine a slope of the rooftop 12. For example, if it is known that a front of the property (e.g., a front door, a driveway) faces a particular direction, a rooftop can be assumed to slope downwards in a direction orthogonal to the particular direction (e.g., for a driveway pointing South towards a street, a rooftop can be assumed to slope upwards to a center point and then downwards when moving from West to East). The UAV can therefore travel to a center of the property, and travel West at a same height and take distance measurements.

To effect the slope determination, the UAV can obtain distance measurements at points on the rooftop 12 and correlate the distance measurements against a 3D position of the aircraft (e.g., location coordinates) to determine the slope of the rooftop. That is, the UAV can determine a point cloud (e.g., a collection of points representing a physical surface that are measured in a particular reference frame, such as WGS84) of distance measurements as it travels over the rooftop 12. Optionally, utilizing information describing the property being inspected, the UAV can determine, or store information describing the rooftop However, utilizing a single-shot measurement sensor, such as a Lidar sensor measuring distance to the UAV at a single location, the UAV is scanning a line on the surface of the rooftop, with the line indicating distance information at singular locations along the line. Since the line is not guaranteed to be in a direction of maximum slope on the rooftop 12 (e.g., the UAV can be flying along a ridge of the rooftop 12 and therefore not detect slope), alternatively other methods can be utilized to determine slope.

For example, the UAV can utilize a planar scanner (e.g., a scanner that measures distance at greater than a single location), in conjunction with information describing the UAVs position and attitude, to generate a fuller 3D point cloud. Similar, the UAV can utilize a full Lidar scanner (e.g., a Veloydne Puck) while performing the rooftop 12 inspection. Optionally, the UAV can utilize a series of captured imagery to generate a 3D point cloud (e.g., utilizing photogrammetry techniques). For instance, captured imagery can be correlated together to precisely determine locations at which each image was taken relative to other images (e.g., matching features, fields of view, and so on, included in images). The images can then be analyzed to determine relative height information of the rooftop 12.

Via a user device interface, the operator 12 can therefore indicate an associated waypoint for each location determined to be damaged, or for slope determination, and the user device can generate a new flight plan that includes the waypoints. As described above, a waypoint is associated with a location (e.g., longitude/latitude coordinates), a safe altitude (e.g., a transit altitude identifying an altitude to enforce when traveling between waypoints), an inspection altitude, a minimum distance to remain above the rooftop 12, and so on. Furthermore, as will be described, the UAV travels to each waypoint and descends, from the inspection altitude, towards the rooftop while capturing one or more images during the descent. The operator 12 can, for each waypoint, one or more actions or maneuvers to be performed by the UAV. For, example, the waypoint may have an action for a number of images to capture during the descent and/or a time interval to wait between capturing images (e.g., the operator 12 can indicate a periodic in time, or distance, value). Additionally, the operator 12 can indicate an order for each waypoint, a particular flight pattern (e.g., the operator 12 can trace a flight pattern for the UAV to follow), and so on. Furthermore, the operator 12 can indicate a rate for the UAV to descend at a waypoint, for instance a nominal rate, a maximum rate, and so on. Optionally, the user device can determine (e.g., based off capabilities of the UAV) a descent rate such that the UAV can descend while remaining substantially stable (e.g., ensuring that the UAV is unstable or shaking while capturing images).

Optionally, the operator 12 can indicate information associated with a particular waypoint, and select another location on the rooftop 30 as being damaged, and indicate that an associated waypoint should utilize the same information. In this way, the operator 12 can quickly tap areas of the user device, and the user device can generate all waypoint information. Optionally, the operator 12 can indicate information associated with waypoints (e.g., prior to indicating locations on the rooftop 30 as being damaged), and can quickly tap waypoints in succession, and the user device can utilize the prior indicated information for each waypoint.

Optionally, the operator 12 can indicate that after the UAV travels to a particular waypoint, or all waypoints), at the safe altitude, the UAV is to hold until receipt of confirmation from the operator 12 to descend. That is, the operator 12 can indicate that the UAV is not free to begin (e.g., without further user input) descending towards the rooftop 12 to capture imagery. This can be useful in situations where the UAV is required to maintain Line-of-Sight with the operator 12. If the operator 12 determines that the UAV will be out of Line-of-Sight, and that the operator 12 has to move locations, the operator 12 can indicate to the UAV to begin descent upon moving to a different location (e.g., the UAV can receive wireless information from the user device of the operator 12). Optionally, in some implementations, the operator 12 can directly control the descent (e.g., control a speed of descent, provide corrections to the descent flight path, or manually control the UAV). To indicate that the UAV is to hold at the safe altitude prior to descending, the operator 12 can interact with the user device to select an selectable option associated with a waypoint (e.g., the selectable options can include an option for an autonomous photo survey, or for a semi-autonomous photo survey).

Figure 10A:
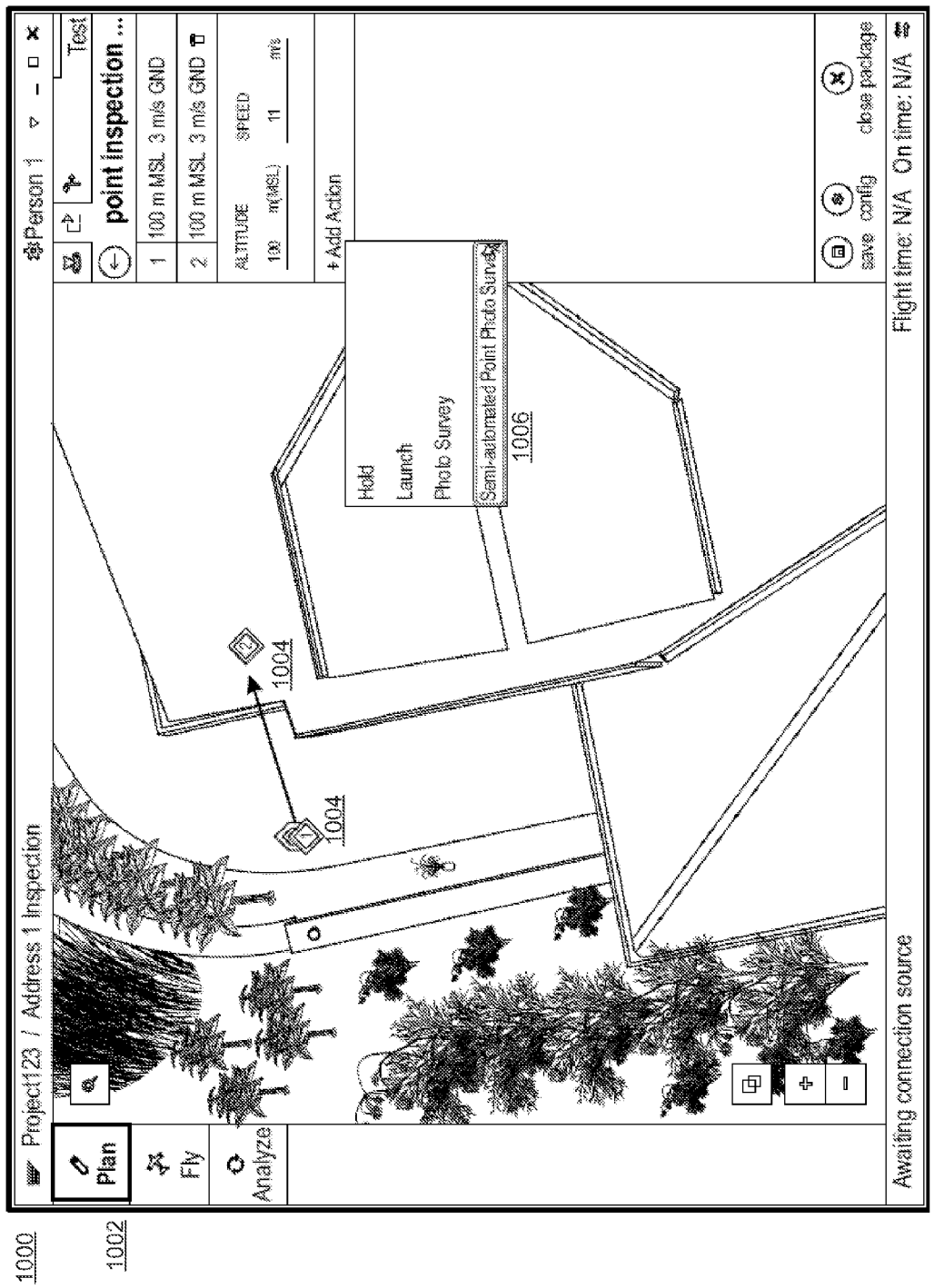
FIG. 10A illustrates an example user interface for assigning waypoints, and designating actions to take at each waypoint.
Figure 10B:
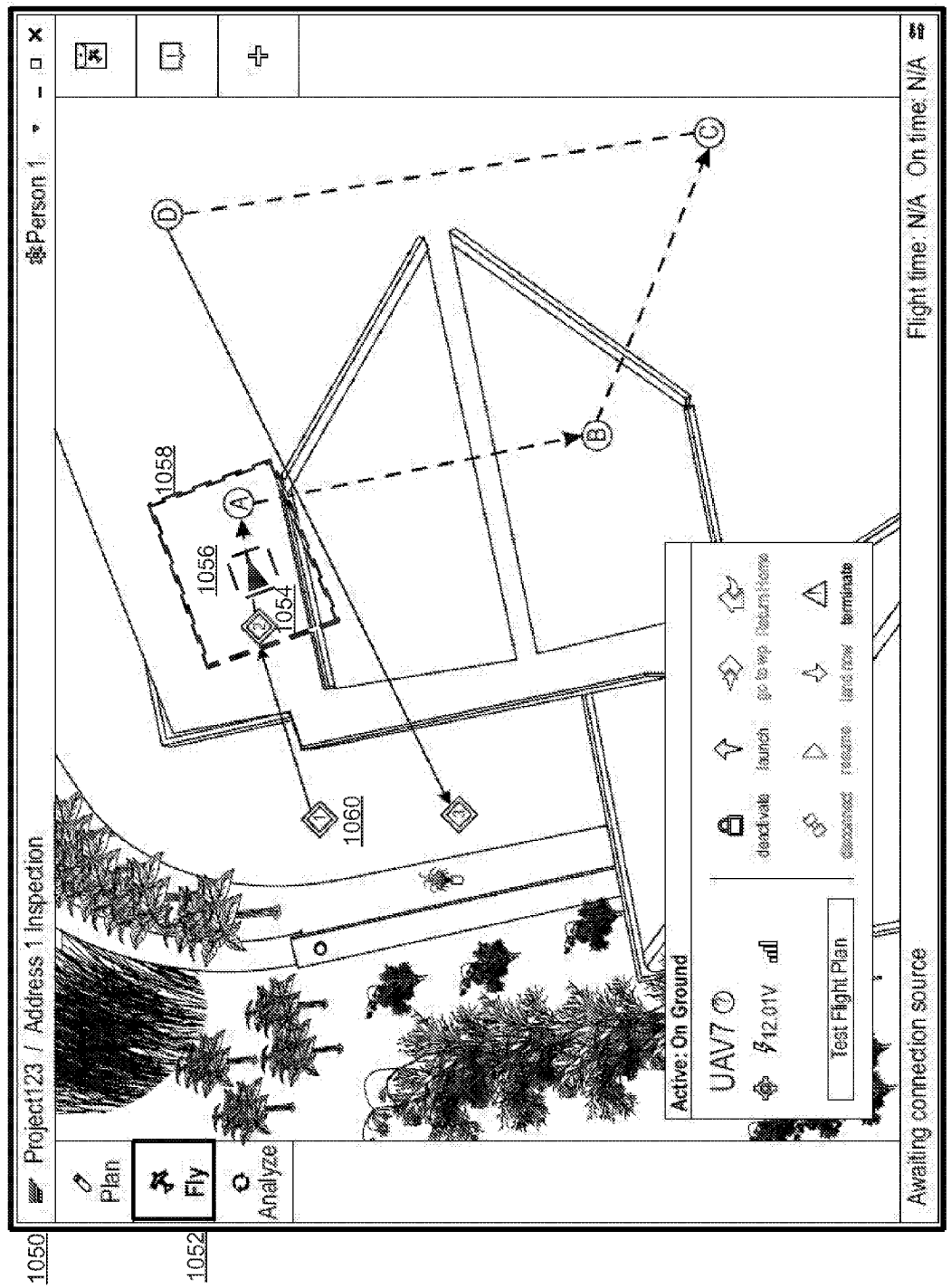
FIG. 10B illustrates an example user interface showing a representation of the UAV 10 implementing a flight plan.

For instance, FIG. 10A illustrates an example user interface 1000 for assigning waypoints, and designating actions to take at each waypoint. As described above, an operator 12 can indicate that after traveling to a particular waypoint, the UAV is hold at the waypoint until the operator's 12 confirmation to descend. As described above, and as will be described below with reference to FIG. 6, the operator 12 can specify waypoints associated with damage (e.g., possible damage), and the UAV 12 can descend towards the specified waypoint (e.g., descend towards the rooftop 30).

To effect the assignment of waypoints for damage inspection, the operator can interact with the user interface 1000 (e.g., on a user device) to specify waypoints in a planning 1002 process (e.g., the operator 12 has selected an interactable button for making a plan 1002), for instance by interacting with a touch-sensitive screen displaying the user interface 1000, or by selecting a portion of the user interface 1000 (e.g., with use of a mouse). As illustrated in FIG. 10A, the user interface 1000 includes imagery (e.g., satellite imagery, imagery captured by the UAV during the first flight), and upon interaction with the user interface 1000 to a particular portion of the user interface 1000, the user interface 1000 can be updated to identify actions 1006 to take at the waypoint. Additionally, the operator 12 can specify a take-off location 1008, and optionally a landing location for the UAV 10 to land at after performing the subsequent inspection of the rooftop 30.

For example, the operator 12 has interacted with the user interface 1000 to specify that waypoint 2 10004 is to be inspected in a subsequent flight. The user interface 1000 therefore presents a user interface element specifying actions 1006 that can be taken, which can include an autonomous descent by the UAV 12 upon traveling to the waypoint 2 10004, or an operator approved, or manually controlled, descent at the waypoint 2 1004. The operator 12 can specify that the waypoint 2 10004 is to be associated with a "Photo Survey", which can indicate that the UAV 12 can descend towards the roof 30 upon reaching the waypoint 2 1004 (e.g., vertically above the waypoint 2 1004). Similarly, the operator 2 can specify that upon reaching waypoint, the UAV 12 is to hover until the operator 12 confirms that the UAV 12 can descend (e.g., "Semi-automated Point Photo Survey." The assigned waypoints and associated actions can be provided to the UAV 12 for implementation (e.g., as described below with respect to FIG. 10B which is described in FIG. 1B).

Optionally a UAV can include functionality to actively determine whether it is within line-of-sight of an operator 12. For instance, the UAV can utilize cameras to actively ensure that the operator 12 is within sight. Alternatively, the operator 12 can wear an object (e.g., a visual object, an object that outputs particular electromagnetic radiation, and so on), and the UAV can ensure that the object is within line-of-sight. In this situation, the UAV can hold at a waypoint prior to descending if it is not within line-of-sight of the operator 12, or can automatically descend if it determines it is within line-of-sight.

The waypoint information indicated by the operator 12 can be provided to the UAV 10 for implementation (e.g., as described above). Optionally, all information associated with a waypoint (e.g., location, transition speed, descent speed, and so on as described above) can be associated with respective inputs of a command that the UAV can implement. For instance, the command can be associated with a particular maneuver (e.g., rooftop inspection of damaged locations), and inputs to (e.g., parameters of) the command can be the information associated with the waypoint. In this way, the user device can simply package the information indicated by the operator 12 as a command, and the UAV 10 can utilize the command to perform complex maneuvers.

Optionally, the UAV 10 computer system can enforce privacy protections for real-world areas outside of the property boundary geofence 14. For instance, the UAV 10 can determine that portions of captured images include real-world areas outside of the property boundary geofence 14.

To effect this determination, the UAV 10 can utilize information describing a field of view of an included camera (e.g., the field of view can be based on a focal length of the camera, an aperture of the camera, and so on), and position and attitude of the camera (e.g., attitude of a gimbal that controls movement of the camera). The UAV 10 can then determine a real-world field of view of the camera, and using position information of the UAV 10 can determine which portions of captured imagery include private information (e.g., imagery outside of the property boundary geofence 14). Optionally, prior to storing obtained imagery, the UAV 10 can process each image to remove (e.g., blank out) or substantially blur private portions of imagery. Optionally, the user device, or cloud system, can process each image to remove or blur private portions of imagery. For instance, as the UAV 10 travels over the rooftop 30, any portions of captured imagery that include private home 22 can be removed.

Figure 1B:
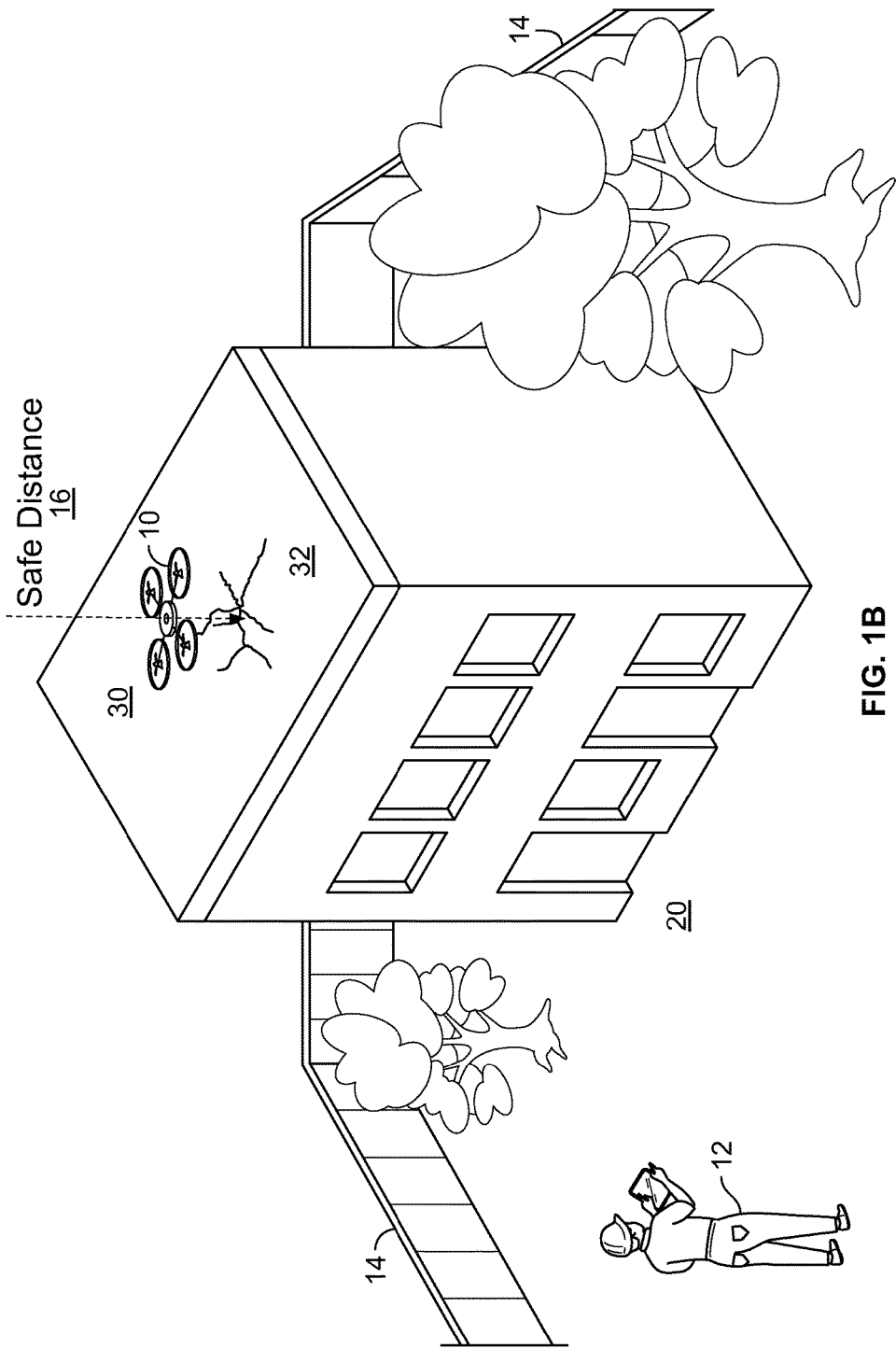
FIG. 1B illustrates an example of a UAV performing a new flight plan to perform rooftop damage inspection of a property.

FIG. 1B illustrates an example of an Unmanned Aerial Vehicle (UAV) 10 performing the new flight plan to perform rooftop damage inspection of a property 20. In the example, the operator 12 has indicated that a location 32 on the rooftop 30 (e.g., a location in an image presented on his/her user device that illustrates the rooftop 30) is damaged. Optionally, the selected damage type may have a selected area of inspection, for example the user device may receive a selection of a variable radius circle (or other user affordance) over a suspected damaged area. The user device then determines an inspection height distance based on the size of the circle area. A smaller circle may indicate that a closer height distance by the UAV to the rooftop is needed to obtain higher resolution images, or other detailed sensor data. A corresponding GSD value based on the size of the circle may be displayed on the user interface. Also, the user interface of the user device, may allow for an inspection level for a selected damaged area. For example, different level of detailed inspection (for example, high, medium, low) may be selected. A high level of detail will identify that the UAV should vertically fly to a closer distance to the rooftop, than a medium level, and a medium level closer than a low level.

Different inspection levels may be needed for different damage types for needed sensor data. Also, the level of detailed inspection may correspond to the sensors used for an inspection. For example, a high level of detail may indicate that more sensors (such as photographic image, and thermal data is collected, whereas a low level of detail may indicate that only a photographic image is collected). Additionally, the user device interface may allow the user to select one or more data collection types for the suspected damaged areas. In this case, the UAV may have multiple payload sensor devices, or a single sensor capable of collecting various sensor data. For example, the user may want to select only thermal data to be collected for one damaged area, and only photographic data to be collected for another damaged area. Thus, for the new flight plan a waypoint is generated that includes the associated sensor(s) that will be used or triggered to collect the particular image or sensor data needed. Also, the user device may be configured with an image classifier, the user device can determine appropriate sensors for use by the UAV to inspect damaged areas, and select the appropriate sensor for the particular waypoint.

The interface user affordance may represent the location to capture a single image at the required pixel resolution (GSD), or a series of images. Ideally, the size of the image taken will represent nominally the size of a physical "test square" commonly used by a human rooftop assessor. In the case of a camera that allows for electronic control, the interface for selecting the waypoint may also include other camera configuration criteria, such as focal length, zoom level, aperture, time, flash, flash output level. Also, the interface may allow for the selection or input of a number of images to be taken at a waypoint. The flight plan for each waypoint for example may be configured such that the camera takes two or more images of the identified damaged location. The image may be taken with the same camera settings, or the camera may be controlled so that the multiple images have different camera settings.

Optionally, during the initial flight the image or images obtained may be unsuitable for the user to visually identify an area that has possible damage. In other words, the image may not show sufficient detail for the user to see damage to the rooftop. For example, during the first photo survey, the UAV may have triggered an attached camera when a gust of wind causes the UAV to shift, thus resulting in a blurred image. The user device may automatically detect frames of the stitched image map that are not suitable for the user to identify detailed damage. This may be done by running a process on each frame to detect its clarity or quality, or may be selected manually by the visual review of the operator. The user device can then mark, or designate, the particular images as unsuitable. Also, while the UAV is in flight, sensors, such as onboard accelerometers or onboard rotational rate gyros, can detect a sudden movement of the UAV. If the movement if beyond a threshold level, this information may be logged by the UAV computer system, and the image taken at that time can be identified as unsuitable. Along with the waypoints selected by the user and received by the user device, waypoints for the locations of the unsuitable images may also be included in the flight plan. For example, for those images identified as unsuitable, the user device may automatically add, or offer to add with user confirmation, waypoints for those locations associated with the unsuitable images. This functionality allows for the new flight plan to include those locations where there "may" be possible damage, but could not be confirmed from the initial image(s) taken. During the subsequent flight, the UAV will then perform a detailed inspection of the rooftop for those locations associated with images that are manually selected by the user, or determined by the user device, and for those images determined as unsuitable.

For a conducted flight plan, the interface of the user device may display the UAV moving along the pre-planned flight path. While in flight, the UAV may transmit its geo-spatial location to the user device. Also, the UAV may also transmit information to the user device indicating that a photograph has been taken, and the coordinates of the photograph. The UAV may also transmit a thumb-nail image of the photograph to the user device. The interface of the user device then may display a user affordance, such as an icon, or the thumb-nail image, representing a location where the image was taken. Also, the UAV may be optionally configured to transmit in real-time the images to the user device. An example of a user interface to be presented on the user device is described below, with reference to FIG. 10B.

The UAV 10, conducting the subsequent flight plan, travels at the safe distance 16 to a location 32 of the damaged rooftop, for example by flying to a waypoint associated with the location of an identified damaged area. After determining that a current location of the UAV 10 corresponds to the location 32 of the damaged rooftop (e.g., within a threshold tolerance, due to GPS drift), the UAV 10 descends to within a threshold distance (e.g., one meter, two meters, 5 meters, a distance indicated by the operator 12 on the user device) to the rooftop 30 at the location of the damaged rooftop 32.

Optionally, the UAV captures live downward-looking image frames, and compares the live captured images to the previously-generated stitched mosaic, or compared to a "central" photo. Comparing between the live image frames and mosaic, or "central" photo involves extracting visual features in both images and running (e.g., executing) a feature matching algorithm, such as RANSAC (e.g., Random sample consensus), across them, which can be used to estimate the relative pose (position and orientation) of the UAV camera with respect to the geo-rectified stitched mosaic, or the "central" photo. The relative pose is then used determine the location of the UAV (and the UAV's location with respect to the denoted damaged rooftop) in situations when other localization devices (e.g. GPS) are unavailable or unreliable. As the UAV 10 descends, it activates sensors included with the UAV 10, and captures real-world information describing the damaged rooftop 32. The UAV 10 can reach a threshold distance above the rooftop 30 prior to activating sensors (e.g., 5 meters, 10 meters, the distance indicated by the GSD), or the UAV 10 can activate sensors periodically starting from the safe distance 16.

Additionally, as described above the UAV 10 can travel to a waypoint (e.g., location 32), and hover at the waypoint until receiving information from the operator 12 indicating the UAV 10 can safely descend. Optionally, the operator 12 can view a user interface 1050 that includes each waypoint the UAV 10 is to travel to, and specifies a present location of the UAV 10 (e.g., the UAV 10 can provide location information while flying, to indicate a progress of the UAV 10 performing the inspection of the rooftop 30).

FIG. 10B illustrates an example user interface 1050 showing a representation 1056 of the UAV 10 implementing a flight plan (e.g., the operator 12 has selected an interactive button 1052 for monitoring a UAV). As described above, an operator 12, or other user, can monitor the UAV 10 moving along a particular flight path. As illustrated in FIG. 10B, the representation 1056 of the UAV 10 is traveling from a first waypoint 1060 (e.g., a safe take-off location) to a second waypoint 1054 adjacent to multiple inspection waypoints (e.g., a waypoint at which the UAV 10 is to descend and perform an inspection for damage, such as inspection waypoints A-D). The user interface 1050 can include imagery (e.g., stitched imagery) obtained during the initial flight plan (e.g., described above with respect to FIG. 1A), or can include satellite imagery of the property 20. As described above, in FIG. 1A, the representation 1056 of a UAV can optionally be bounded by a quadrilateral 1058 representing a field of view of a sensor of the UAV 10 (e.g., a camera, with the field of view being determined by the altitude, location, and attitude information of the UAV 10). Optionally, the quadrilateral 1058 can be presented when the UAV 10 is conducting the initial flight plan, and not when the UAV 10 is implementing the flight plan to perform rooftop inspection. In this way, the operator 12 can quickly determine, in the initial flight plan, that the UAV 10 captured imagery of the entirety of the rooftop 30.

Optionally, the quadrilateral 1058 can be presented while the UAV 10 is implementing the flight plan to perform the rooftop inspection, and once the UAV 10 reaches an inspection waypoint (e.g., inspection waypoint A) and descends, the quadrilateral 1058 can decrease in size during the descent (e.g., since the UAVs 10 field of view would decrease). Once the UAV 10 reaches within the threshold distance of the rooftop (e.g., based on the user affordance described above), the quadrilateral 1058 can highlight, flash, or otherwise alert the operator 12 that the field of view includes acceptable detail of the rooftop 30.

Additionally, optionally upon the UAV 10 navigating to an inspection waypoint (e.g., waypoint A), the user interface 1050 can be updated to indicate that the UAV 10 is waiting for the operator's 12 confirmation to descend. The operator 12 can then utilize the user interface 1050 to either provide information to the UAV 10 indicating the UAV 10 can safely descend, or the operator 12 can provide manual control of the UAV 10 (e.g., control a descend throttle). The manual control can, optionally, only allow the operator 12 to control a vertical descent towards the rooftop 30. For instance, any manual commands associated with pitch, roll, and yaw, will be discarded by the operator's 12 user device, or optionally by the UAV 10. Optionally, the operator 12 can override the discarded commands, and manually control pitch, roll, yaw, and so on.

As the UAV 10 descends, the UAV 10 uses an included location sensor (e.g., a GPS receiver) to maintain the UAV's 10 location in a vertical descent towards the location 32 of the damaged rooftop. Since any movement not purely in the vertical axis can cause the sensors to obtain real-world information (images) not specifically of the damaged portion 32, the UAV 10 optionally ensures that it moves substantially in the vertical direction. For instance, the UAV 10 can utilize sensors that measure movement (e.g., an Inertial Navigation System (INS) that measures position and attitude information, or using visual odometry system to measure position via digital images, such as stored images or images received from the user device) to detect whether the UAV is moving horizontally, and if so corrects the movement. Additionally, the UAV 10 can optionally ensure that the center of obtained images of the damaged rooftop 32 (e.g., as the UAV 10 descends) correspond to the center of the image obtained during the initial flight (e.g., described in FIG. 1A), that was indicated by the operator 12 as being damaged. For instance, as described above, the operator 12 can select an area of the rooftop 30 that he/she determines to be damaged or likely to be damaged. Since the UAV 10 therefore has image data of the damaged area 32, the UAV 10 can utilize one or more visual classifiers and/or computer vision algorithms, to determine that the center of the images being obtained during descent correspond to the image data of the damaged area 32. Optionally, the UAV 10 can have information describing a 3D model of the property 20.

To ensure that the UAV 10 descends vertically, the UAV 10 can utilize a sensor that measures distance (e.g., a LiDAR sensor, a Leddar sensor), and utilizing information describing a speed of the UAV's 10 descent (e.g., the UAV 10 can determine velocity from distance traveled within a period of time, and in particular, can determine speed of a downward vertical distance traveled within a period of time), the UAV 10 can determine whether the measured distance information comports with the speed of the UAV 10. For instance, if the rooftop 30 is at a slope, if the UAV 10 drifts in one direction, the distance might increase, or decrease, due to the UAVs 10 movement, and not just due to the speed of descent. Therefore, the UAV 10 can determine that it moved horizontally, and using the 3D model can determine and apply an appropriate correction. Similarly, the UAV 10 can use imagery obtained by cameras to compare its location to information describing the 3D model of the property (e.g., the UAV 10 can determine that it is located at a particular three-dimensional coordinate within the 3D model space).

The real-world information 16 can be gathered according to one or more triggers as the UAV 10 descends. For instance, the UAV can selectively activate one or more of the included sensors, periodically (e.g., every 3 seconds, 10 seconds, operator 12 indicated amount of time), based on a distance descended (e.g., every 10 centimeters, every ¼ meter, every meter, operator 12 indicated distance, and so on, where an altimeter (e.g., a laser, barometric, or radio altimeter) may be used to determine altitude and a change in altitude), in response to an event, etc. For example, if a first sensor senses a first event, a second sensor may be activated in response. Additionally, the triggers can depend on capabilities of the UAV and included sensors, such as a focal length of the camera (e.g., a shorter focal length can provide a wider angle of view, enabling less pictures to be taken), an aperture of the camera (e.g., a wider aperture can enable the camera to obtain pictures with less noise, by utilizing a lower ISO, but have shallower depth of field and potentially require more images), and so on.

The UAV 10 descends until reaching the threshold distance from the rooftop 30, then ascends back to the safe distance 16. The UAV 10 then travels to one or more other locations identified by the operator 12 as being damaged, and travels to a safe landing location. The real-world information obtained by the UAV 10 is provided to the user device of the user 12. For instance, the UAV 10 can provide the information wirelessly (e.g., using a BLUETOOTH connection, a Wi-Fi connection, a near field communication connection, and so on) and/or using a wired connection with the user device. Additionally, the UAV 10 can provide the real-world information as it obtains it (e.g., in substantially real-time).

The UAV 10, the user device of the operator, or the cloud system, can optionally automatically classify (e.g., using visual classifiers, computer vision algorithms) damage seen in the real-world information. As will be described, the rooftop damage can be characterized (e.g., one or more labels can be assigned to the damage), such as hail damage, no damage, wind damage, poor imagery, and so on. Optionally, real-world information of the property 20 in a prior period of time (e.g., prior to damage) can be used as a reference point when determining damage. That is, the UAV 10, user device, or cloud system, can compare the present obtained real-world information to the prior real-world information as a baseline. For example, a historical record of the thermal images of a rooftop may be compared to a new thermal image of the rooftop to aid a determination as to whether the rooftop has been damaged (e.g., by determining if the rooftop is radiating significantly more heat than under historically similar weather conditions). Additionally, the real-world information can be used to train, or update, the one or more visual classifiers (e.g., a reviewing user can determine a correct label for the damage, and the visual classifiers can be updated to incorporate the correctly labeled damage).

While the UAV computer system autopilot module is navigating the UAV for the inspection, certain aspects of the flight pattern may be controlled by the operator's user device. For example, while the UAV is performing an inspection of a rooftop of a structure, the UAV would be ascending and/or descending and obtain sensor information describing the structure, for example triggering a camera to obtain digital images. The flight plan or pattern may be configured such that for a particular inspection location a vertical ascent/descent rate, UAV altitude, horizontal UAV rotation, payload gimbal, payload direction, or trigger a payload sensor may be controlled by the operator. The user device may have a physical control such as a toggle or joystick, or a user interface control, that allows the user to control vertical ascent/descent rate, UAV altitude, UAV attitude, horizontal UAV rotation, payload gimbal, payload direction, or trigger a payload sensor while conducting the inspection. For example, the UAV may navigation via autopilot to a position over an inspection location, and the operator then can provide input to the user device, and the user device may transmit a signal or information corresponding to the user input, to the UAV (via radio communication) to control the vertical ascent/descent rate, UAV altitude, UAV attitude, horizontal UAV rotation, payload gimbal, or payload direction, or trigger a payload sensor. This particular mode allows for partial auto-pilot control, and manual operator control of the UAV. In this case, the UAV automatically via autopilot moves from inspection location to inspection location, but the operator has the ability to control the vertical ascent/descent rate, UAV altitude, UAV attitude, horizontal UAV rotation, payload gimbal, or payload direction, or trigger a payload sensor. However, even though the operator may control the vertical ascent/descent rate, the UAV still may enforce the highest altitude, and the lowest altitude the UAV may fly to, or closest distance allowed to the structure. Additionally, the operator may choose to hold the position of the UAV, and manually trigger one or more sensors of the UAV. The user device may receive an input indicating that the UAV should move to the next inspection location (or could receive an input to move to a previous inspection location). In this case, the UAV will then resume autopilot mode and move over the next inspection location to perform an inspection of the rooftop for possible damage. The inspection may continue in an autopilot mode, or may again be partially manually controlled by the operator using the user device. Additionally, the UAV may receive a command from the user device to nudge the UAV in a particular direction. In this case, the control input of the user device, allows for sending a command to the UAV to move slightly, for example between 0.1 to 3 meters, in a particular direction (in an x, y, or z axis, or diagonally). The particular distance can be predetermined, or be variable based on the proximity to the structure. Nudging the UAV, allows the operator to move the UAV away from the structure if the operator sees that the UAV flying too close to the rooftop. The nudge command may be provided any time to the UAV while it is operating in an auto-piloted mode. However, the UAV should still enforce geofence boundaries and not allow a nudge to cause the UAV to move beyond across a geofence boundary envelope.

Figure 2:
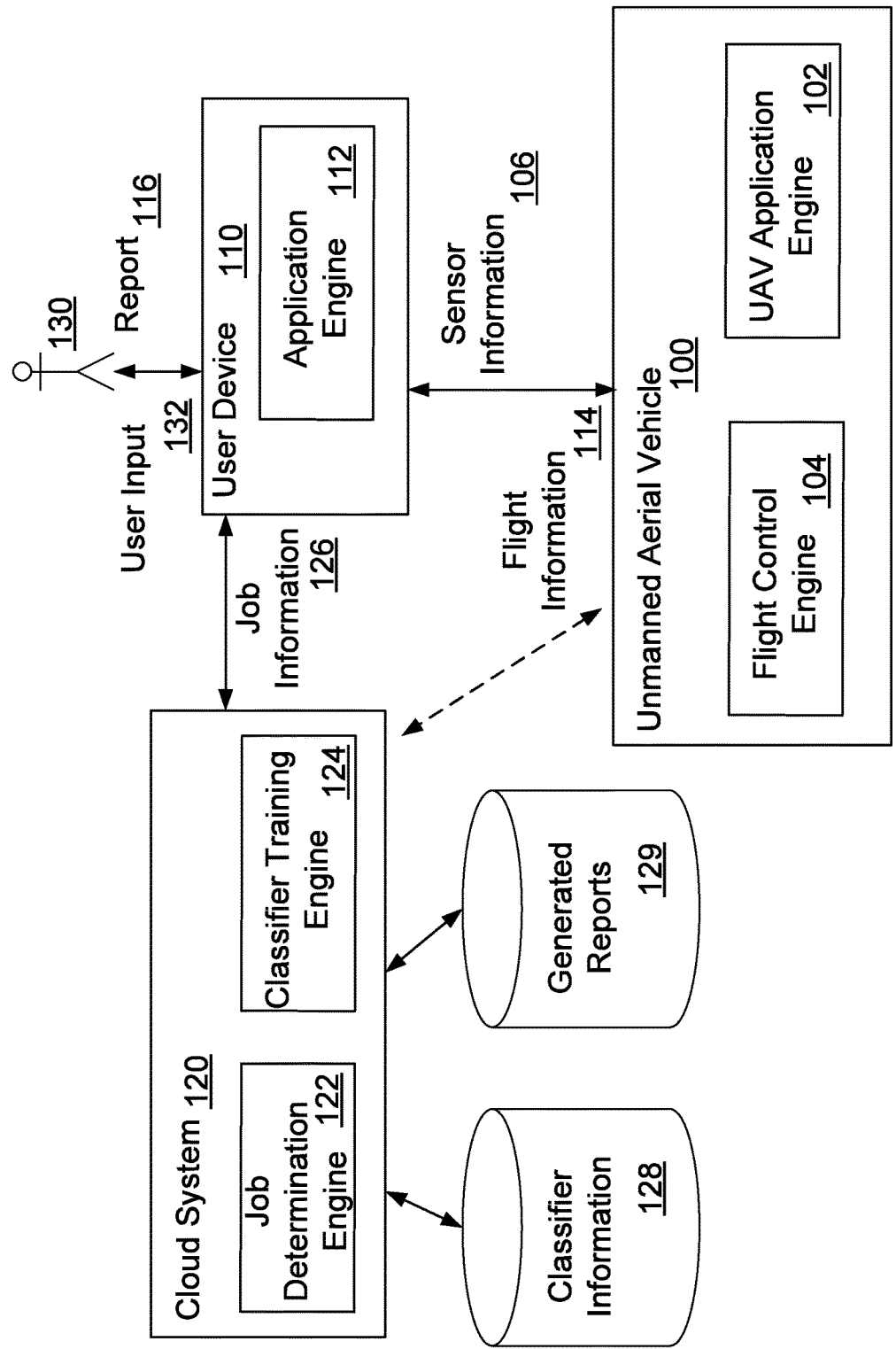
FIG. 2 illustrates a block diagram of example systems utilized in performing a rooftop inspection of a property.

FIG. 2 illustrates a block diagram of example systems utilized in performing a rooftop inspection of a property. The block diagram includes a user device 110 in communication with an Unmanned Aerial Vehicle (UAV) 100 and a cloud system 120 (e.g., a system of one or more computers in communication with the user device 110 over a network, such as the Internet). Additionally, the UAV 100 can be optionally in communication with the cloud system 120 (e.g., over a network, such as the Internet, or through an intermediate system). As described above, the cloud system 120 can determine job information 126 describing one or more tasks to perform inspections of one or more properties, and the UAV 100 can perform inspections of the one or more properties.

The cloud system 120 includes a job determination engine 122 that can receive, or obtain, information describing jobs, and determine job information 126. The job determination engine 122 can generate interactive user interfaces (e.g., web pages to be rendered by a user device) for presentation on a user device (e.g., the user device 110). A user of the user device (e.g., user 130 of user device 110) can provide (e.g., user input 132) information associated with a particular job in the interactive user interfaces.

For instance, the user can enter an address of the property to be inspected, and the job determination engine 122 can obtain information describing the property. The information can include, property boundaries of the property (e.g., from a database, or system that stores or can access property boundary information), geo-rectified imagery (e.g., satellite imagery) of the property, and so on. The job determination engine 122 can determine a property geofence envelope for the UAV 100 to enforce (e.g., the UAV 100 can be required to remain within or substantially within the property boundaries of the property).

Similarly, the job determination engine 122 can receive information describing the rooftop to inspect at the property. The cloud system 120 can generate user interface data that includes imagery of the property, and the user can indicate boundaries of the rooftop. For instance, as described above, the user can select corners of a polygon that encompasses the rooftop (e.g., corners of the rooftop).

After determining a geofence envelope, the job determination engine 122 can receive information describing an expected type of damage, and information relevant to configuration information of the UAV 100 (e.g., information describing a type of UAV, sensors included in the UAV, and general functionality that can be performed by the UAV 100). For instance, the job determination engine 122 can receive information identifying that hail damage is expected, or is to be looked for, and can determine that a UAV which includes particular sensors, and specific visual classifiers to identify hail damage, is needed (e.g., a heat and/or thermal imaging sensors, specific visual classifiers that can discriminate hail damage from other types of damage, wind damage, rain damage, and so on).

The job determination engine 122 can receive a time that the job is to be performed (e.g., a particular day, a particular time at a particular day, a range of times, and so on). The job determination engine 122 can then determine an availability of UAVs and/or operators at the received time(s). Additionally, the job determination engine 122 can filter the available UAVs according to determined configuration information (e.g., as described above). Optionally, the job determination engine 122 can access weather information associated with the received time(s), and determine an optimal time or range of times for the job to be performed. For instance, a UAV that includes particular sensors (e.g., electro-optic sensors) can obtain better real-world information at particular times of day (e.g., at noon on a sunny day can provide better imagery by maximizing image contrast and minimizing the effects of shadows).

The job determination engine 122 can then provide the determined job information 126 to the user device 110, and optionally directly to the UAV 100. For instance, the UAV 100 can be located in an area with a multitude of UAVs, and the cloud system can select the UAV 100 (e.g., based off configuration information, availability, and so on). Optionally, the user, via the user device 110, can override the cloud system UAV selection, and can instruct that the job be provided to a UAV selected by the user. The UAV 100 can then receive the job information 126 (e.g., over a wired connection, or over a wireless connection such as Wi-Fi, BLUETOOTH, and so on).

The user device 110 includes an application engine 112 that can receive the job information 126, and can generate user interface data describing the job information 126. An operator of the UAV 100 can travel to the property identified in the job information 126 with the UAV 100, and view information describing the job information 126. Optionally, the application engine 112 can receive modifications, from the operator, to the job information 126, including updates to the rooftop boundary, and so on. Optionally, the application engine 112 can allow particular modifications (e.g., rooftop boundary), but not other modifications (e.g., the property boundary cannot be modified). The application engine 112 can receive information to effect the job, including a safe altitude (e.g., as illustrated in FIGS. 1A-1B), and safe take-off/landing locations (e.g., the application engine 112 can display imagery of the property, and the operator can indicate the safe locations).

The application engine 112 can provide flight information 114 to the UAV 100, which is information sufficient to effect a safe inspection of the rooftop according to the job information 126. For instance, the flight information 114 can include a geofence envelope determined from the property boundary, the safe altitude, boundaries of the rooftop, and so on. The flight information 114 can further include a flight plan for the UAV 100 to follow. As described above, the UAV 100 can travel over the property according to particular flight patterns that can depend on the rooftop boundaries, and configuration information of the UAV 100. For example, the application engine 112 can determine that the UAV 100 is to fly in a particular zig-zag pattern (e.g., as described above), based on configuration information of the UAV 100 and the inputted safe altitude. That is, the application engine 112 can determine that based on the particular focal length, sensor resolution, and so on, of a camera included in the UAV 100, that the distance between each leg of the zig-zag pattern is to be a particular distance apart (e.g., a leg can be traveling along a first axis of the rooftop, and a subsequent leg can be traveling along the first axis in the opposite direction shifted by a distance in the orthogonal axis). In this way, the application engine 112 can determine that there will not be holes in the camera's coverage, such that the images of the rooftop can be stitched together (e.g., each image will contain enough visual information to identify subsequent and prior legs of the zig-zag pattern), and that the entire rooftop can be imaged at a particular resolution (e.g., a particular number of pixels/distance of the rooftop). Determining a flight pattern is described in more detail below, with respect to FIG. 4.

The UAV can receive the flight information 114 from the user device 110 (e.g., over a wired connection, or a wireless connection). The UAV 100 includes a UAV application engine 102 that can effect the flight information 114 that identifies the job to be performed. As illustrated in FIG. 1A-1B, the UAV 100 can ascend to the safe altitude (e.g., identified in the flight information 114), travel over the rooftop according to the flight pattern, and activate sensors included in the UAV 100 to obtain real-world information describing the rooftop. After obtaining the real-world information, the UAV 100 can provide sensor information 106 to the user device 110. The user device 110 can combine the received sensor information 106 (e.g., stitch together images of the rooftop, generate a 3D model of the property, and so on), and the operator can indicate, on the user device 110, areas of the rooftop that are damaged. The UAV 100 can receive information identifying the areas from the user device 110, and can perform detailed inspections of the damaged areas (e.g., as described in FIG. 1B). The sensor information 106 associated with the detailed inspection can be provided to the user device 110.

To control the UAV 100, the UAV 100 includes a flight control engine 104 that can manage the motors, rotors, propellers, and so on, included in the UAV 100 to effect the flight information 114. Optionally, the UAV application engine 102 can provide commands (e.g., high level commands) to the flight control engine 104, which can interpret the commands to perform the inspection. For instance, the UAV application engine 102 can indicate that the UAV 100 is to descend at a particular location identified as being damaged, and the flight control engine 104 can ensure that the UAV 100 descends in a substantially vertical direction.

After receiving sensor information 106 associated with the detailed inspection of damaged areas, the user device 110 can generate one or more interactive reports 116 describing the damage. A report 116 can be an interactive document (e.g., a web page) that can be provided for presentation on the user device 110 (e.g., in a web browser), or to an outside user device. The report 116 can include a graphical representation of the property (e.g., a dimensioned, graphical map of the rooftop) with damaged areas identified (e.g., highlighted). The operator can indicate types of damage identified, and the report 116 can describe the types of damage, an area of each damaged area, and can provide a reviewing user of the report 116 with access to the raw sensor information 106 for each damaged area. Optionally, the user device 110 or cloud system 120 can determine types of damage from one or more visual classifiers that can operate on the received sensor information 106.

The cloud system 120 is in communication with a generated reports 129 database, that can receive the report 116 and store the report 116 with information describing the report (e.g., information describing the property and rooftop, configuration information of the UAV 100, time information associated with the inspection, and so on). Optionally, the cloud system 120 is in communication with a classifier information 128 database (e.g., one or more databases, or a storage subsystem) that can store information describing one or more visual classifiers (e.g., information utilized by one or more machine learning models, such as support vector machines, k-means clustering, neural networks, and so on, for instance trained by a classifier training engine 124, such as described below with respect to FIG. 7). A reviewing user can review the report 116, and correctly classify the types of damage identified in the sensor information 106. This correctly classified information can be used to update the one or more visual classifiers.

Figure 3:
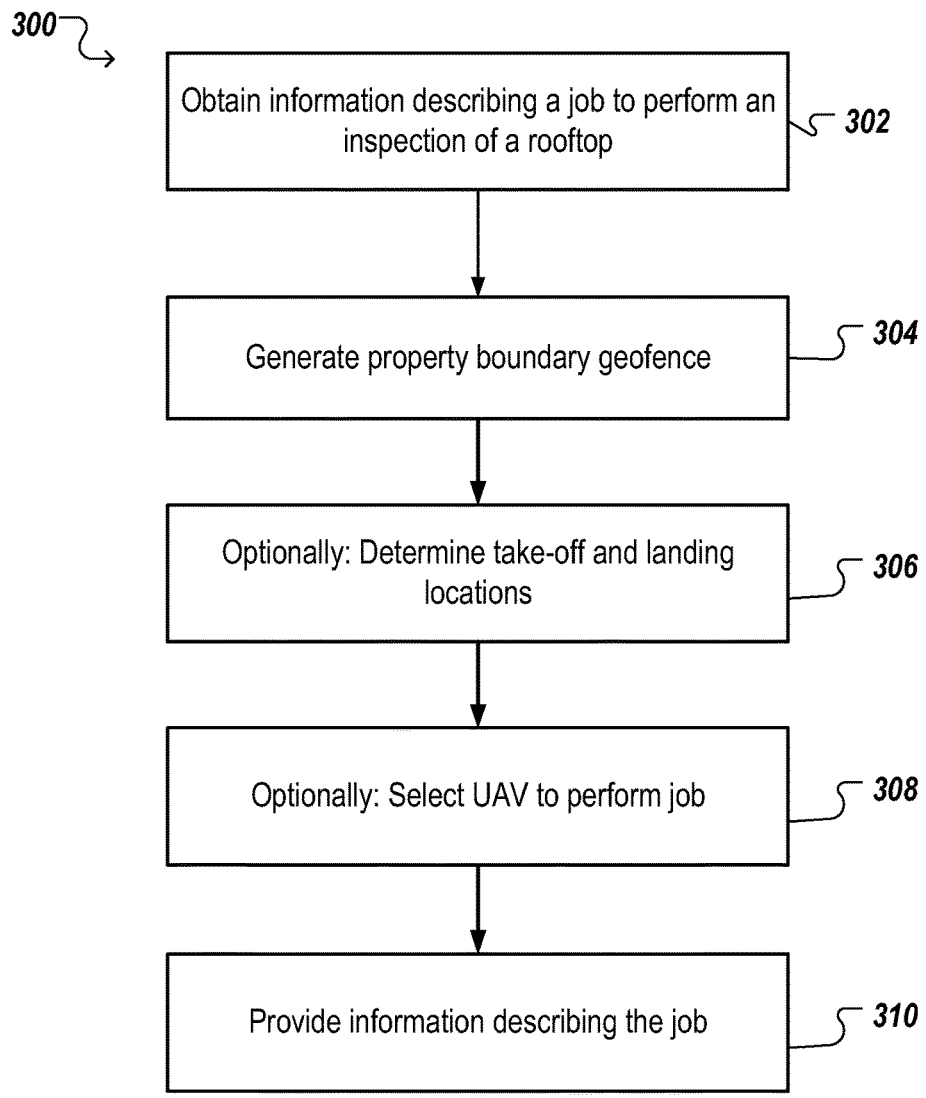
FIG. 3 is a flowchart of an example process for determining information describing a job for a UAV to perform an inspection of a rooftop.

FIG. 3 is a flowchart of an example process 300 for determining information describing a job for a UAV to perform an inspection of a rooftop. For convenience, the process 300 will be described as being performed by a system of one or more computers (e.g., the cloud system 120).

The system obtains information describing a job to perform an inspection of a rooftop (block 302). As described above, the system can generate user interfaces for presentation on a user device of a user that enable the user to enter information associated with a job to perform an inspection. For instance, a severe weather event can cause the user (e.g., an employee of an insurance company) to want to quickly inspect properties included in affected areas. The system can receive a request from the user regarding an inspection, and can provide user interfaces (e.g., one or more web pages) for presentation on the user device of the user, or the system can be associated with a display (e.g., over a wired or wireless connection), and can provide user interfaces for presentation on the display.

The system receives information describing a property to be inspected. For instance, the user can enter an address associated with the property, and the system can obtain information describing the property. For instance, the system can obtain boundaries of the property (e.g., from commercial, or governmental, databases or systems), or the system can obtain geo-rectified imagery of the property (e.g., satellite, or mapping, imagery), and provide the imagery for presentation on the user device of the user. The system can receive selections of the boundary from the user (e.g., the user can trace the property boundaries), or the system can determine the boundaries from the imagery (e.g., the system can utilize computer vision techniques to identify the boundaries). The system stores information describing the property boundaries.

The system receives information describing the rooftop included in the property boundaries to be inspected. The system can determine the boundaries from the imagery of the property (e.g., the system can identify contours of the rooftop using edge detection techniques, or using k-means clustering and machine learning algorithms to identify the boundaries as described above). Additionally, the system can provide imagery of the property for presentation on the user device, and the user can indicate boundaries of the rooftop. For instance, the user can select (e.g., the user can click on corners of the rooftop with a mouse, with his/her finger, and so on) the boundaries of the rooftop. Optionally, the user can trace the boundaries of the rooftop, and the system can correlate the tracing to the image of the rooftop, to identify a correct boundary (e.g., a contour of the rooftop). For instance, a particular rooftop can be circular in shape, and the user can trace a circle corresponding to the rooftop. The system stores information describing the rooftop (e.g., GPS coordinates of the boundaries, or information describing location and shape information of the contour of the rooftop).

The system can optionally receive a starting time of the job to perform the inspection, or a particular range of times that the user would prefer. As described above, the system can obtain weather information, and determine an optimum starting time (or range of starting times) of the job. The system can provide recommendations regarding starting times for presentation to the user, and the user can select from among the recommendations, or the user can select a different time. The system can obtain indications of schedules of other jobs, and schedules of operators that can perform the job. The system can provide information to the user indicating operators that are available to travel to the property, and perform the job in concert with a UAV at the selected time. Additionally, the system can modify the selected time according to other jobs that are being performed within a threshold distance of the identified property. For instance, the system can determine that a different job to inspect an adjacent property is to be performed at a particular time, and can recommend that to the user that operator and UAV performing the different job also perform the entered job at the same time (e.g., subsequent to the different job). In this way, the system can batch multiple jobs together to be efficiently performed by a same UAV and operator.

As an example of utilizing weather information, the system can determine whether weather will negatively affect the inspection. For instance, the system can determine that the weather will be cloudy, rainy, and so on, and that one or more of the sensors included in the UAV will be negatively affected or if the flying conditions will be unsafe. Furthermore, the system can determine locations of the sun during the inspection, and based on the locations, can determine whether the sun will be pointed at the one or more of the sensors of the UAV (e.g., the bright light of the sun can cause clipping in the image) based on the start time of the inspection and location information of the property. The system can recommend alternate times, or recommend a particular UAV to perform the inspection (e.g., a UAV with filters to reduce bright light).

The system generates a property boundary geofence (block 304). The system determines a property boundary geofence for the UAV to enforce, ensuring that the UAV is to remain with the property boundary of the property to be inspected. The system can store location information of the geofence, which can include a 2D envelope (e.g., limiting the UAV to a 2D area in the real-world) or a 3D envelope (e.g., limiting the UAV to a 3D volume in the real-world.). As described above, with reference to block 302, the system can obtain information describing a property boundary. For instance, the property boundary information can include a speciation of precise location coordinates (e.g., GNSS coordinates) that describe one or more locations on a peripheral of the boundary. Additionally, the property boundary information can include curve information sufficient to describe the boundary, for instance Bezier curves. The property boundary can be utilized to define the property boundary geofence for the UAV to enforce.

The system optionally determines a safe take-off location and a safe landing location (block 306). In some implementations, the system can determine a take-off location (e.g., a location from which the UAV is to begin the job), and a landing location (e.g., a location at which the UAV is to complete the job).

As described in block 302, the system can obtain imagery (e.g., satellite imagery) of the property. The system can analyze the obtained imagery to determine a safe take-off location that is suitable for the UAV to initiate the job. To determine a suitable location, the system can utilize computer vision techniques to identify features that are known, by the system, to indicate a suitable take-off location. For instance, the system can determine whether the obtained imagery includes a sidewalk, a driveway, a roadway (e.g., a street), or other open clearing. Optionally, the system can obtain location information indicating boundary information of sidewalks, roadways, and so on (e.g., from a government or commercial database), and can utilize the boundary information to identify sidewalks, roadways, and so on, in the obtained imagery. For instance, the system can determine, from the boundary information, locations in the obtained imagery that correspond to sidewalks, roadways, and so on. The system can then analyze the locations to ensure that no obstructions exist (e.g., fire-hydrants, light posts, and so on).

Furthermore, the system can utilize color information included in the obtained imagery to better determine whether particular features correspond to driveways, roadways, sidewalks. That is, a substantially ray color can likely correspond to a driveway, whereas a substantially green color can correspond to foliage, trees, and so on. Optionally, the system can determine a measure of central tendency of a color of a location, and a variance from the measure of central tendency. In this way, the system can determine whether a driveway, or other cement object known to be suitable, is substantially gray, and if the driveway has a variance greater than a threshold, the system can determine the driveway is unsuitable.

Similarly the system can determine one or more locations that are not suitable as a safe take-off location. For instance, the system can identify features that are known to indicate that a location is not suitable (e.g., features of a house, a fence, a pool, a tree, a bush, within a threshold distance of a power line, and so on).

The system can present information to the user indicating locations that have been determined to be suitable, and optionally locations that have been determined to not be suitable. The user can then select a suitable location, and the system can designate the location (e.g., GNSS coordinates associated with the location) as the safe take-off location. Optionally, the system can receive a selection of a particular location the user prefers, and the system can determine whether the location is suitable (e.g., likely suitable greater than a threshold), or unsuitable (e.g., likely unsuitable at greater than a threshold). Upon a determination that the location is unsuitable, the system can present user interface data indicating the location is unsuitable and can block the location from being selected. Optionally, the user can override the system's determination, and the system can designate the location as the safe take-off location.

Additionally, the system can perform the above analysis and processes to determine a safe landing location. The safe landing location can be designated, and utilized by the UAV when performing the job. Optionally, the system can designate multiple safe landing locations, such that if a contingency situation is determined (e.g., the UAV is running out of battery charge, liquid fuel, and so on), the UAV can safely land at a nearest safe landing location.

The system optionally selects a UAV to perform the job (block 308). As described above, the system can optionally receive information describing the types of damage of interest. For instance, the system can generate user interface data that includes selectable options describing different types of damage for selection by the user.

The system can determine configuration information of a UAV that is beneficial to identifying the selected type of damage. For instance, to determine hail damage the UAV can benefit from a heat sensor or thermal imager (e.g., older hail damage has higher heat loss than newer hail damage). Additionally, a given type of damage may benefit from an infra-red sensor, an ultra-violet sensor, a sensor that can measure radiation, a sensor that can detect chemical leaks, a camera with a longer focal length (e.g., enabling the UAV to take detailed images without getting too close to the property), and so on.

The system can then obtain configuration information of UAVs that are available to be utilized during the selected time (e.g., described above in block 302). The system can identify the UAVs that include the determined configuration information, and select a UAV. Additionally, the system can provide information to the user describing the determined configuration information, and the user can specify the configuration information when an operator selects a UAV to bring to the property.

The system provides information describing the job to a UAV and/or user device in communication with the UAV (block 310). The system can provide information describing the job to the UAV (e.g., the selected UAV described above), and the UAV can be taken by an operator to the property. Similarly, the job information can be provided to a user device of the operator, and operator can modify information, and provide the modified information to the UAV.

Figure 4:
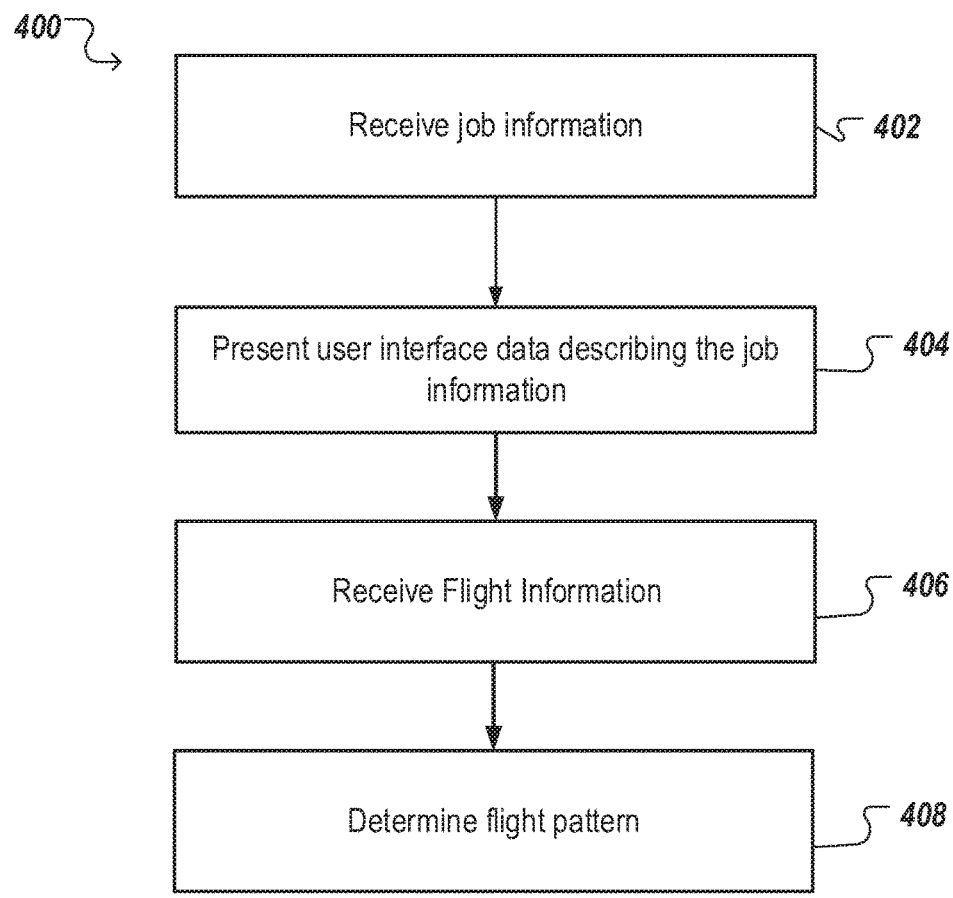
FIG. 4 is a flowchart of an example process for determining flight information to perform a job.

FIG. 4 is a flowchart of an example process for determining flight information to perform a job. For convenience, the process 400 will be described as being performed by a user device of one or more processors (e.g., the user device 110). Optionally, the process 400, or particular blocks or features of the process 400, can be implemented by the cloud system 120. As a non-limiting example, the cloud system 120 can perform block 408.

The user device receives job information (block 402). As described above, the system can determine job information (e.g., from information received from a user of the system), and can provide the job information to the user device.

The user device presents user interface data describing the job (block 404). The user device generates user interface data to describe information entered by the user that requested the inspection be performed (e.g., described in FIG. 3). For instance, the user device can generate one or more interactive documents (e.g., web pages), that include summary data describing the inspection.

The user device can present a graphical representation of the property (e.g., satellite or mapping imagery) with the property boundary identified (e.g., highlighted), and the rooftop identified (e.g., the rooftop boundary can be highlighted, the rooftop can be colored a particular color, the rooftop can be shaded, a determined flight plan to inspect the rooftop can be illustrated, and so on). Optionally, the user device can receive modifications to the presented information. For instance, the operator can modify the rooftop boundary (e.g., trace an updated boundary, indicate updated corners of a polygon that encompasses the rooftop and so on.) Additionally, the operator can indicate that an obstruction exists in a particular location on the property (e.g., a large tree, antenna, or air conditioning unit can cover a portion of the rooftop). Optionally, the operator can take imagery of the obstruction and its location in the property, and the user device can determine boundaries of the obstruction. The user device can store information describing the obstruction, which can be used by a UAV when traveling (e.g., flying).

The user device receives additional flight information (block 406). The user device receives information specific to the property, including a safe altitude above which the UAV can travel freely without encountering obstructions within the property boundary. The operator can visually inspect the property, and determine the safe altitude (e.g., estimate a safe altitude). Optionally, the operator can take an image of the property (e.g., the operator can hold a camera and take a picture), and using height information of the property (e.g., obtained from a property database), the user device can determine an estimated height of obstructions (e.g., trees) within the property boundary. Additionally, the user device can receive location information (GPS coordinates) identifying a safe take-off location, and a safe landing location.

The user device, or optionally cloud system 120, determines a flight pattern for the UAV to follow (block 408). As described above, with respect to FIG. 1A, the UAV can follow a particular flight path that can be based off a boundary of the rooftop (e.g., an area of the rooftop, and shape information of the rooftop) and configuration information of the UAV (e.g., whether the UAV is a fixed-wing aircraft or a multi-rotor aircraft that can make sharp turns). Block 408 can optionally be performed by the cloud system (e.g., cloud system 120) or the UAV (e.g., UAV 100). The flight pattern can be associated with real-world coordinates (e.g., GPS coordinates) for the UAV to follow, or the UAV can follow the flight path using imagery obtained of the rooftop while flying along with location information of the UAV.

For a multi-rotor aircraft (e.g., a quadcopter, and so on), the user device can determine that a zig-zag pattern is to be used. As described in FIG. 1A, the zig-zag pattern describes a pattern in which the UAV flies parallel to a first axis associated with the rooftop boundary, turns towards an orthogonal axis for a particular distance, and then flies parallel to the first axis in the opposite direction. Each flight along the first axis can describe a leg of the zig-zag flight pattern. The user device can define the particular distance to travel along the orthogonal axis such that sensor information obtained by the UAV in flight includes overlapping real-world information (e.g., imagery) from a first leg and a subsequent adjacent second leg (e.g., when the UAV travels the opposite direction along the first axis shifted in the orthogonal axis by the particular distance). The particular distance can be based off configuration information of the UAV, such as a focal length of an included camera. For instance, a camera with a long focal length will need a comparatively shorter distance between legs than a wide-angle lens, since the camera can see less of the rooftop in each image. Therefore, the user device can determine the particular distance, and a number of legs that will cause the UAV to obtain sensor information of the entire rooftop.

The flight pattern can include waypoints that describe the determined flight pattern. For instance, the waypoints can indicate lengths along the first axis, and a distance from the first axis to the second axis (e.g., distance of each leg, and distance between legs, as described above). Optionally, the UAV can execute an application (e.g., a user application) that can receive the waypoints, and utilize the waypoints to effect the flight pattern. That is, the user device, or cloud system 120, can package the flight pattern into one or more waypoints that are understandable, to the application, as being associated with the zig-zag pattern.

Additionally, optionally the user device can receive an indication of a ground sampling distance (e.g., a number of image pixels/distance). Using the configuration information (e.g., a number of pixels of a sensor included in a camera of the UAV), the user device can determine a minimum altitude for the UAV to fly at. If the minimum altitude is greater than the safe altitude, the user device can prefer that the UAV fly closer to the minimum altitude. In this way, since the UAV is flying higher and can capture a greater area of the rooftop in each image, the number of legs in the zig-zag pattern can be reduced.

The user device provides the flight information to the UAV (block 410). The user device provides sufficient information to the UAV to enable the UAV to perform the inspection. For instance, the user device can provide the safe altitude, the flight pattern, and so on. After receipt of the flight information, the user device can provide a request, or instruction, to the UAV to begin the inspection. That is, the user device can execute an application (e.g., an "app" downloaded from an application store, or otherwise installed on the user device) that is in communication with the UAV.

As described above, with reference to FIG. 1A-1B, the UAV can perform an initial inspection to obtain sensor information of the rooftop (e.g., images). After damaged areas of the rooftop are identified, a subsequent inspection can be performed to obtain detailed sensor information of each identified damaged area.

Figure 5:
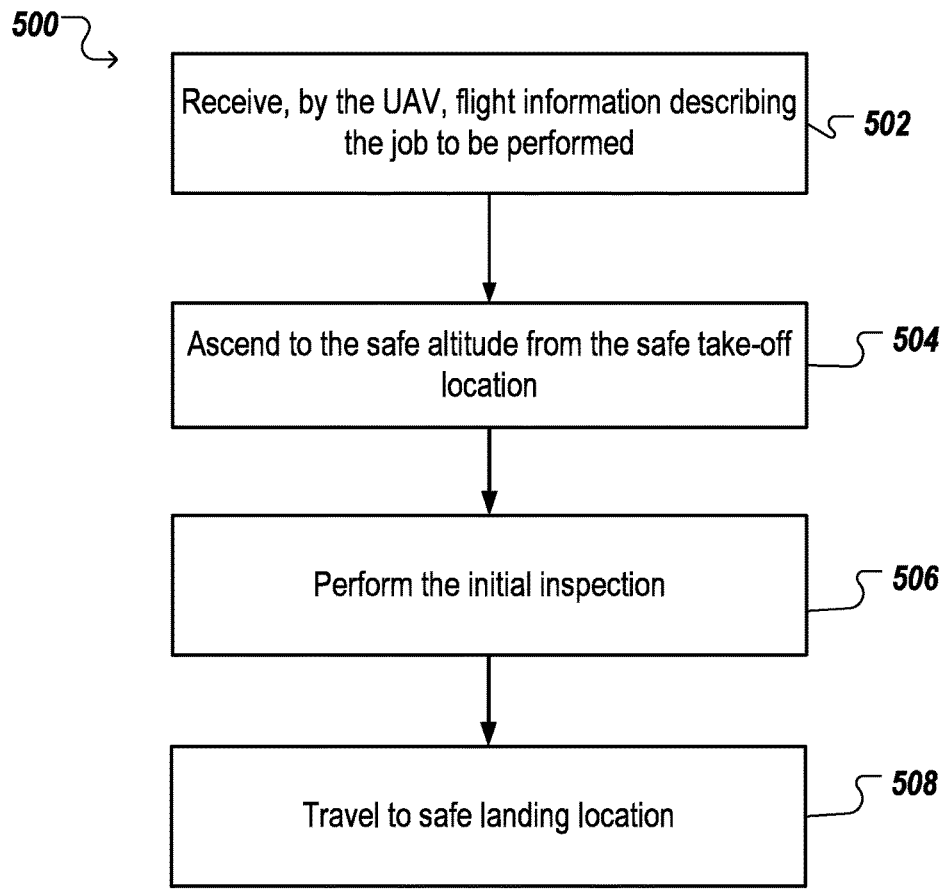
FIG. 5 is a flowchart of an example process to perform an initial inspection of the rooftop.

FIG. 5 is a flowchart of an example process to perform an initial inspection of the rooftop. For convenience, the process 500 will be described as being performed by a system of one or more processors (e.g., the UAV 100).

The UAV receives flight information describing the inspection job to be performed (block 502). As described above, the UAV receives flight information sufficient to enable to the UAV to perform the inspection.

The UAV ascends to the safe altitude from the safe take-off location (block 504). The UAV can be moved (e.g., by the operator) to the safe take-off location, and upon receipt of a request to begin the initial inspection, the UAV can ascend to the safe altitude. Optionally, the UAV can immediately ascend to the safe altitude and assume that once it receives the request to begin the initial inspection, it is located at a safe take-off location.

Once the UAV reaches the safe altitude, it travels at the safe altitude to an initial location over the rooftop. The flight pattern information can indicate a starting point to perform the inspection, or the UAV can determine a closest point of the rooftop, travel to the closest point, and then begin the flight pattern based on the closest point.

The UAV performs the initial inspection (block 506). The UAV travels along the determined flight path (e.g., determined by the user device, cloud system, or by the UAV), and activates sensors included in the UAV along the flight path. The UAV can activate the sensors (e.g., obtain images) periodically in time (e.g., every half a second, every second), or periodically in distance (e.g., every meter, every two meters). The periodic schedule can depend on configuration information of the sensors included in the UAV, for instance, a camera with a longer focal length and a smaller field of view can require a greater number of images to be taken since each image includes a comparatively smaller area of the rooftop than a shorter focal length.

The obtained real-world information from the sensors can be provided (e.g., substantially in real-time) to the user device of the operator. Optionally, the user device can provide directions to the UAV in flight. For instance, the operator can indicate that a portion of the real-world information obtained by the UAV was of poor quality (e.g., out of focus image) or was not obtained. The UAV can then receive information describing a location of the rooftop that is to be flown over again to obtain updated real-world information.

The UAV travels to the safe landing location after inspecting the rooftop (block 508). Upon completion of the flight path, the UAV travels to safe landing location at the safe altitude, and descends back to the ground, or hovers at the safe landing location. Optionally, the real-world information obtained by the UAV can be provided to the user device along with metadata for the information (e.g., position/attitude information of the UAV for each image, gimbal attitude of a camera when taking an image, and so on).

The user device, or cloud system, generates a geo-rectified image of the obtained real-world information and metadata obtained from the UAV. The user device, or cloud system, can utilize photogrammetry software to stitch the images together to generate a geo-rectified image of the rooftop. Optionally, the user device, or cloud system, can generate a 3D model of the rooftop and property. As described above, the UAV can utilize a wide-angle lens to obtain images of the sides of the property (e.g., a side of a home), and using the obtained imagery, a 3D model can be generated.

The user device presents the geo-rectified image of the rooftop, and/or presents the generated 3D model in one or more user interfaces. The operator indicates areas of the rooftop that he/she determines to be damaged, and the user device stores location information (e.g., GPS coordinates) of the damaged areas. Alternatively or in addition, the user device, or cloud system, can optionally automatically determine damaged areas (e.g., as will be described below). The user device then provides location information of the damaged areas to the UAV. Optionally, the operator can swap out one or more sensors included in the UAV for the subsequent inspection. For instance, the operator can remove a camera included in the UAV, and include a camera with a comparatively longer focal length.

Figure 6:
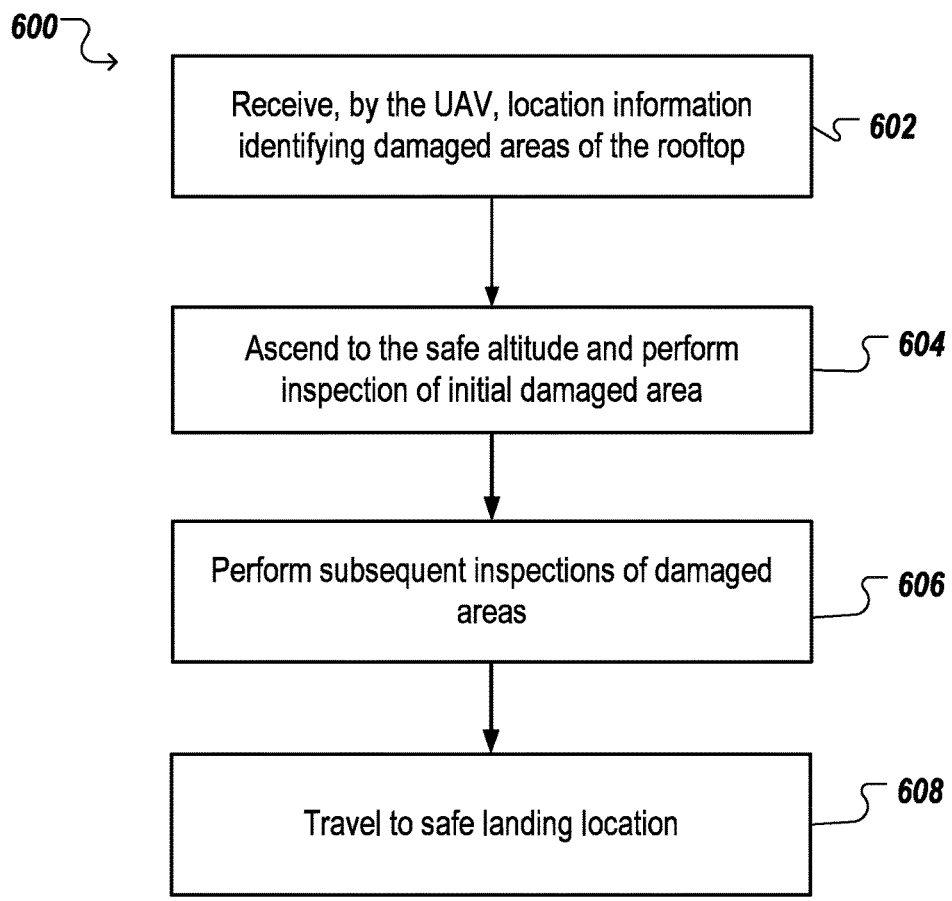
FIG. 6 is a flowchart of an example process for performing a subsequent inspection of the rooftop.

FIG. 6 is a flowchart of an example process 600 for performing a subsequent inspection of the rooftop. For convenience, the process 600 will be described as being performed by a system of one or more processors (e.g., the UAV 100).

The UAV obtains location information of damaged areas of the rooftop (block 602). As described above, the operator can indicate damaged areas of the rooftop, and the user device can provide location information identifying the damaged areas.

The UAV ascends to the safe altitude, and performs an inspection of an initial damaged area (block 604). As illustrated in FIG. 1B, the UAV travels to an initial damaged area (e.g., a damaged area closest to the UAV), and descends vertically towards to the rooftop at the initial damaged area.

As the UAV descends, the UAV activates the sensors included in the UAV to obtain real-world information describing the damaged area. As described above, the UAV can activate the sensors after being within a threshold distance above the rooftop (e.g., determined using a LiDAR sensor, a barometric sensor, and so on), and can obtain real-world information periodically until reaching a threshold distance above the rooftop (e.g., a meter, two meters).

As described with respect to FIG. 1B, as the UAV descends it ensures that it is descending vertically to maintain the damaged area as the focus of the included sensors. That is, a GPS receiver, or other location sensor, can provide information identifying a location of the UAV. However, while the GPS receiver can provide a degree of accuracy, corrections to the location information can be required to ensure that the damaged area remains in focus. Thus, the UAV can optionally ensure that the damaged area remains in the center of each captured image as the UAV descends. To effect the above, the UAV can obtain one or more images illustrating the damaged area (e.g., obtained from the initial inspection described in FIG. 5), and can ensure that images being taken periodically as it descends, comport with the obtained images (e.g., the images obtained during the initial inspection). The UAV can execute one or more visual classifiers to discriminate between portions of the rooftop that correspond to the damaged area, and portions that lie outside of the damaged are (e.g., the UAV can identify fixed features in the images of the damaged area from the initial inspection, and determine corresponding locations in the periodically taken images). As the UAV descends, the UAV can correct the vertical descent (e.g., provide corrections to the remaining axes).

Similarly, the UAV can optionally utilize a 3D model of the property and rooftop to orient itself as it descends. For instance, the UAV can utilize images taken periodically as it descends, and using the location information (e.g., GPS coordinates) with information describing a field of view of the camera, the UAV can determine its location within the 3D model. For example, the UAV can determine, based off periodically taken images, that the UAV is descending over a steeper portion of the rooftop, or that the images show a portion of the rooftop, or property, that should not be visible. The UAV can then provide corrections to its descent, to ensure that the UAV remains vertically over the indicated damaged area. Optionally, the UAV can utilize distance information (e.g., obtained using a LiDAR sensor), to provide fine corrections. For instance, as described above, the UAV can determine that based on its descent speed, the distance to the rooftop should be slightly different, and can provide a correction to move the UAV to a correct location over the rooftop.

The UAV descends until reaching a threshold distance above the rooftop, and then ascends back to the safe altitude while optionally again activating the sensors. The obtained real-world information can be provided (e.g., over a wireless connection) to the user device of the operator. The operator can indicate that one or more of the obtained images are of poor quality, or were never taken. Additionally, optionally, the UAV can determine whether a taken image was out of focus, or was never taken (e.g., the camera failed to fire). The UAV can re-take images of the damaged area (e.g., utilizing metadata of the poor quality image, the UAV can determine its height, travel back to that height, and re-take the image, or the UAV can access metadata indicating that it activated a camera at a certain height, but the camera failed to activate).

The UAV travels to subsequent locations and performs inspections of the associated damaged areas (block 606). As described above, with reference to block 604, the UAV travels at the safe altitude to subsequent locations, descends towards the rooftop and activates the included sensors. Optionally, the UAV can utilize a 3D model of the property to navigate over the rooftop to each subsequent damaged area (e.g., without ascending to the safe altitude), for instance at the distance threshold at which the UAV activates its sensors. Optionally, the UAV can utilize one or more sensors to determine whether obstructions exist in its flight path towards the subsequent damaged areas, and navigate around the obstructions.

If the UAV determines, or the operator indicates, that one or more of the obtained images were of poor quality, or were failed to be taken, the UAV can travel to the associated height and re-take the image. For instance, if the UAV is descending down to a particular damaged area, and determines that images need to be re-taken at a different damaged area, the UAV can complete the particular damaged area, ascend to the safe altitude, and travel to the different damaged area. Optionally, the UAV can utilize a 3D model of the property to navigate over the rooftop back to the different damaged area (e.g., the 3D model can describe height information of the rooftop, obstructions, and so on). Optionally, the UAV can utilize one or more sensors to determine whether obstructions exist in its flight path towards the different damaged area, and can navigate around them to travel to the different damaged area.

The UAV travels to a safe landing location (block 608). After inspecting each damaged area, the UAV can travel to the safe landing location (e.g., at the safe altitude, or at a different altitude if the UAV has a 3D model of the property).

Report Generation and Presentation

After completing the subsequent inspection of the rooftop (e.g., as described in FIG. 6), a report (e.g., an interactive report, or a static report) is generated that describes the inspection. The UAV, user device, or cloud system, can generate the report, and the report can be provided to the operator, or a different reviewing user, for presentation.

As described above, the report can include information describing the flight path of the UAV, such as a graphical representation of the property and flight path, with areas determined to be damaged identified (e.g., highlighted). The report can include textual information describing the determined damage, sensor information (e.g., images) of each damaged area, and the presented report can enable the operator, or other reviewing user, to select damaged areas and access raw image and sensor data describing the damaged area. The operator can include textual information describing each damaged area (e.g., the operator can indicate that a particular damaged area is damaged from hail) and visual information for each damaged area (e.g., the operator can circle portions of an image illustrating the damaged area to identify particular types of damage, and can assign each type of damage a particular color). Additionally, as will be described below, optionally the textual information and visual information can be automatically determined (e.g., using one or more visual classifiers and computer vision algorithms).

System Initiated Inspections

Optionally, the cloud system can determine that a property is to be inspected by determining that an inspection of the property was last performed greater than a threshold amount of time prior (e.g., 6 months, 1 year). Additionally, the cloud system can determine that sensor information for a property (e.g., sensor information obtained in a prior job) is of poor quality (e.g., the camera used by a UAV is substandard compared to current cameras), or that it lacks particular sensor data for the property (e.g., ultra-violet or infrared images), and can determine that the property is to be inspected again. The cloud system can then store information describing the properties, and can schedule jobs associated with each property. The cloud system can prompt a user to review the properties, or trigger notifications to be immediately presented on a user device of a user (e.g., the user device can execute an application in communication with the cloud system).

Automatic Damage Classification

As described above, the UAV, user device, or cloud system, can obtain real-world information obtained during an initial inspection of a rooftop, or during a subsequent inspection of the rooftop, and identify damage (e.g., in substantially real-time as the UAV is flying, or after the UAV has landed). To effect the identification of damage, the UAV, user device, or cloud system, can utilize one or more visual classifiers trained on sensor information (e.g., images) that illustrate one or more types of damage (e.g., a particular classifier can be associated with a particular type of damage). The below discussion describes hail damage, however other types of damage can be automatically identified, including storm damage, tornado damage, fire damage, and so on.

The discussion below will also describe the classifier being determined by the cloud system (e.g., cloud system 120), however the user device, an outside system, the UAV, can also determine the classifier, update the classifier, and so on.

Figure 7:
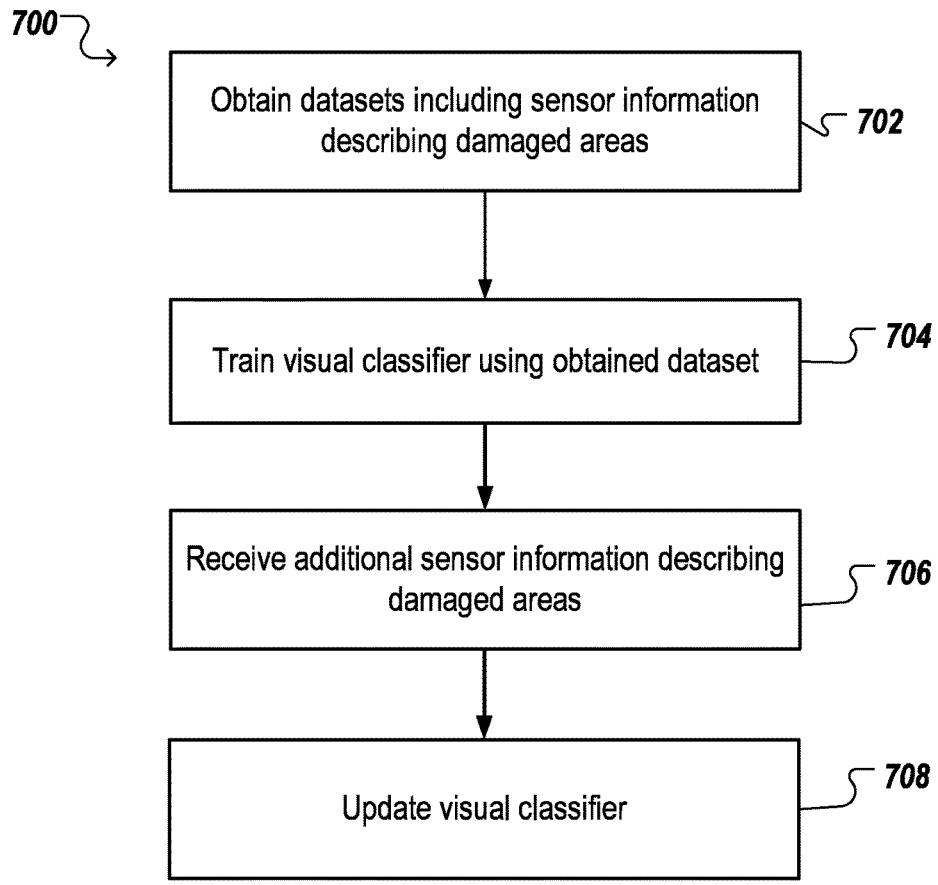
FIG. 7 is a flowchart of an example process to determine a visual classifier to identify rooftop damage.

FIG. 7 is a flowchart of an example process 700 to determine a visual classifier to identify rooftop damage. For convenience, the process 700 will be described as being performed by a system of one or more computers (e.g., the cloud system 120).

The system obtains datasets that include sensor information describing hail damage of rooftops (block 702). The system can receive the datasets from an outside entity (e.g., an insurance company) that determines whether hail damage exists on rooftops of properties. Optionally, the system can obtain sensor information included in reports as described above, with damage identified by an operator. This report information can be obtained over a sufficient period of time to gather a large enough dataset to train a classifier. The datasets can include sensor information describing undamaged areas of rooftops, and/or sensor information describing damaged areas of rooftops. The datasets can further include sensor information describing the same rooftops prior to being damaged (e.g., a before and after image of hail damage).

The datasets can be labeled according to specific damage illustrated, for instance, a reviewing user can identify that a particular image illustrates hail damage, and the identification can be included as metadata with the obtained datasets. Optionally, the datasets can be unlabeled, and can include sensor information of damaged, and undamaged, areas of rooftops. Additionally, the datasets can indicate a type of roof material that was damaged, and the datasets can be organized according to the type of roof material. For instance, hail damage on a wood rooftop might be different than hail damage on a hot-tar-and-gravel roof.

The system trains visual classifier using the obtained dataset (block 704). The system can use supervised, or unsupervised, training techniques to train the visual classifier. As will be described, the trained visual classifier will be used to detect hail damage.

As an example, the system can utilize a support vector machine (SVM) to train the visual classifier. The system can obtain labeled datasets (e.g., the datasets can indicate whether the rooftop is damaged), and the system can generate models describing features that characterize the sensor information as including damage. Additionally, the system can generate models using before and after sensor information of a same rooftop. For instance, the system can determine a difference between the images (e.g., the system can process a before and after image to be oriented from a same perspective, correct for exposure, depth of field, lens effects, and can determine a difference in the images). The difference can be used when discriminating between features that inform hail damage.

Furthermore, the system can utilize features that are known to be indicative of hail damage (e.g., a feature vector), and the visual classifier can determine whether the features exist in received sensor information. For instance, the system can train the SVM to recognize the features, and determine respective weightings of each feature to best characterize sensor information as being indicative of a damaged area or an undamaged area.

As another example, the system can utilize unsupervised training techniques, such as neural network modeling, k-means clustering, and so on. The system can use unsupervised training techniques to determine distinct categories in the obtained datasets, and each category can be labeled by a user (e.g., a reviewing user), or the system can assign likely levels of damage for each category. Additionally, the unsupervised training technique can utilize particular features indicative of hail damage to determine distinct categories in the datasets. Thereafter, to determine levels of damage for each category, the system can assign higher levels of damage that correspond to greater inclusions of the particular features.

A non-exhaustive list of features includes, cracks in ceramic/clay tiles, broken corners of tiles, gaps between shingles, curled edges of a rooftop, dents in a wooden rooftop, organisms growing on shingles, such as moss or algae, shingle splitting (e.g., fresh split wood can be lighter in color than older wood, indicative of recent hail damage), surface nail damage, spatter marks, whether shingles are lifted or turned, whether surface nails are raised above their normal level (e.g., popping out), and so on. Additionally, the system can utilize features that describe directionality of damage, for instance the system can determine that where a rooftop has similar impact on similarly positioned roof slopes (e.g., within a threshold distance from the rooftop being inspected), there is likely hail damage on the rooftop being inspected. That is, if the system detects hail damage (e.g., using the above features) on a rooftop in a particular area along a particular direction, the system can increase a likelihood of a different rooftop being damaged if it is within the particular area and along the particular direction.

The system receives additional sensor information describing damaged areas (block 706). The system can obtain sensor information that has been obtained during an inspection of a rooftop, and incorporate the obtained sensor information in improving the accuracy of the visual classifier. For instance, an operator, or other reviewing user, can receive information describing whether obtained images of an area of a rooftop are indicative of damage (e.g., labeled by the visual classifier). The operator, or other reviewing user, can indicate that the label is correct or incorrect. The system can utilize the updated labeled information to provide corrections to the visual classifier (e.g., as a feedback loop).

The system updates the visual classifier (block 708). As described above, the system can determine updates to the visual classifier. The updated visual classifier can be stored for use by UAVs, user devices, or by the cloud system.

Figure 8:
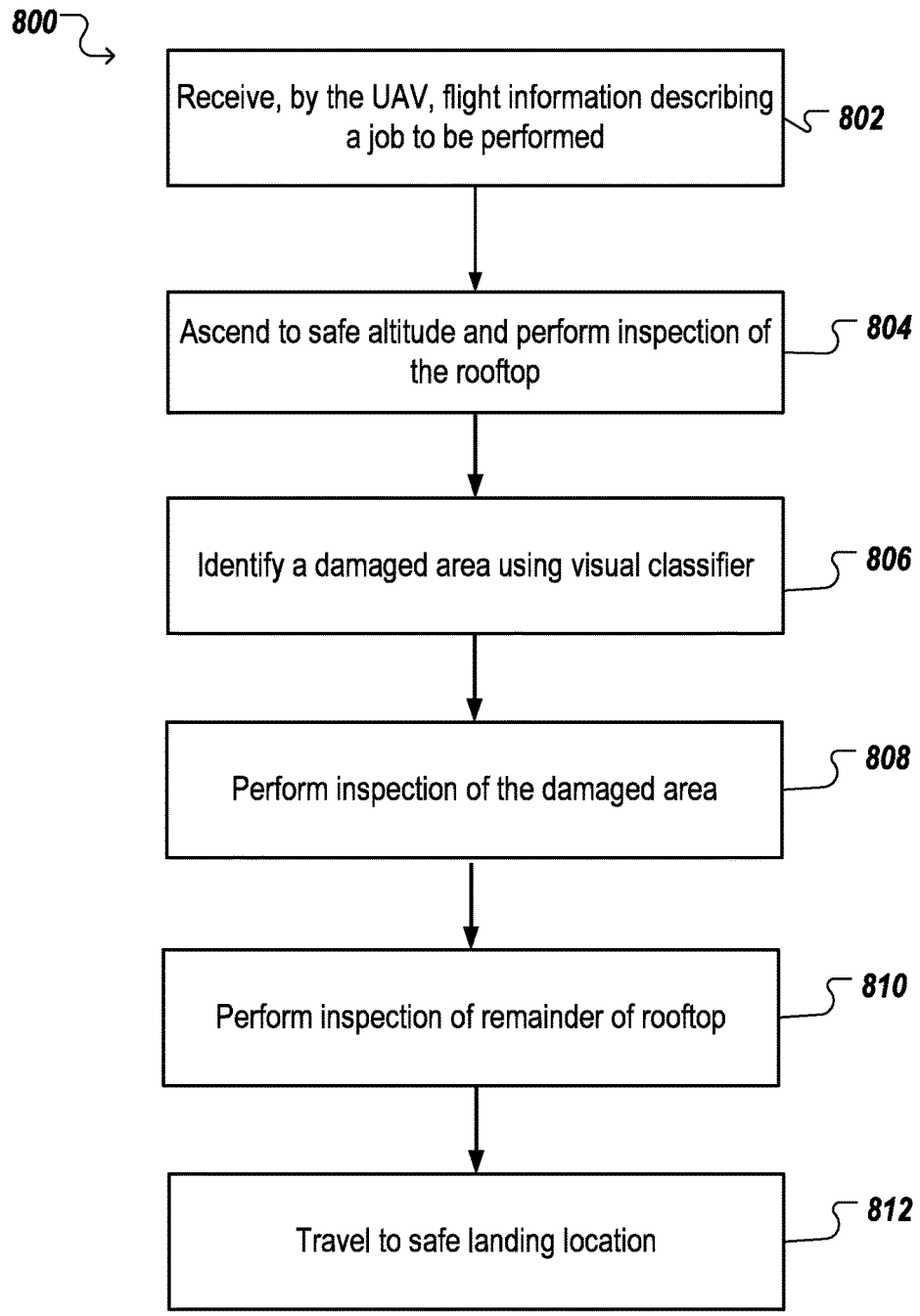
FIG. 8 illustrates an example process for performing an inspection of a rooftop using the visual classifier.

FIG. 8 illustrates an example process for performing an inspection of a rooftop using the visual classifier. For convenience, the process 800 will be described as being performed by a system of one or more processors (e.g., the UAV 100).

The UAV receives flight information describing a job to be performed (block 802). As described above, with reference to FIG. 5, the UAV receives (e.g., from a user device, or from the cloud system) information describing a job.

The UAV ascends to safe altitude and performs inspection of the rooftop indicated in the job information (block 804). The UAV ascends to a safe altitude (e.g., indicated by an operator adjacent to the UAV) and performs a flight pattern over the rooftop. As the UAV travels, it obtains sensor information of the rooftop. Optionally, the UAV can utilize a first included sensor (e.g., a camera with a wide-angle lens) to obtain sensor information, and then a second included sensor (e.g., a camera with a longer focal length) to obtain sensor information when damage has been identified. Optionally, the UAV can use either the first type of sensor or the second type of sensor exclusively.

The UAV identifies a damaged area of the rooftop using the visual classifier (block 806). The UAV can execute the visual classifier on received sensor information (e.g., images), and determine whether damage is evident. For instance, the visual classifier can determine whether the features described above are included in the obtained sensor information. The visual classifier can further utilize obtained sensor information of the rooftop at prior points in time (e.g., points in time when the rooftop did not have damage) to compare currently obtained sensor information to the prior sensor information (e.g., as described in FIG. 7). In this way, the specific features can be more clearly established and illustrated for use by the visual classifier. Additionally, the UAV can utilize information identifying whether nearby rooftops have been determined to have damage (e.g., rooftops at a same slope, same height, and so on, as the presently being inspected rooftop). The UAV can also utilize information describing a material the rooftop is made of (e.g., wood, tile, clay) for use in identifying damage (e.g., some of the features indicative of hail damage are specific to particular materials).

The UAV can then determine whether an area being inspected includes damage. Since the damage might be localized to a particular area within obtained sensor information (e.g., a small portion of the rooftop within each obtained image), after determining the damaged area, the UAV can travel directly above the damaged area, and maintain the damaged area in focus.

The UAV performs an inspection of the damaged area (block 808). As described above, the UAV can travel (e.g., fly) directly over the damaged area, and then descend towards the damaged area. As the UAV descends, it activates one or more sensors to obtain sensor information describing the damaged area (e.g., as described above, with reference to FIG. 6).

The UAV performs an inspection of the remainder of the rooftop (block 810). After completing the inspection of the damaged area, the UAV ascends to the safe altitude, and determines whether damage is evident elsewhere on the rooftop (e.g., using the visual classifier). Additionally, as described in FIG. 6, the UAV can utilize one or more sensors to detect obstructions, and can travel over the rooftop at less than the safe altitude using the sensors.

The UAV travels to a safe landing location (block 812). As described in FIG. 6, upon completion of the inspection, the UAV travels to the safe landing location. A report describing the inspection can be generated (e.g., by the UAV, user device, or cloud system, as described above). The report can include labels determined by the visual classifier for damaged areas, and the visual classifier can be updated according to whether the visual classifier correctly characterized the rooftop. Additionally, the report can include particular features that were evident in each damaged area (e.g., nail sticking above roof, algae detected, and so on).

The processes described in FIGS. 5-6 and 8 can be modified to include features from each other figure. For instance, the process of FIG. 8 can be modified to include an initial inspection and a subsequent inspection, while still using a visual classifier.

Although in one embodiment of the invention, as described above, the system is primarily used to create and transmit job information (e.g., as described in FIGS. 3-4) to a UAV or user device (e.g., ground control station), the UAV or user device can initiate the request for job information from the system. That is, the UAV or user device (e.g., user of the user device) can arrive at a property location, and then request job information, or updated job information. For example, the UAV or user device can determine its geospatial position via a GNSS receiver (using GPS, GLONASS, Galileo, or Beidou system). The UAV or user device can then transmit its location information to the system, along with other identifying information about the requesting device, such as its UUID, or Mac address, etc. The system will then receive the request, and determine if updated or changed job information exists by comparing the device identifier to a database storing new or updated job information. If new or updated job information exists, then new or updated job information will be transmitted from the system, and received by the UAV or user device. A confirmation acknowledging receipt of the job information may then be transmitted from the UAV or user device to the system. The system will then update the database indicating that the particular job information has been received. Moreover, the UAV or user device can supply the property location, and a new job request can be sent to the system. The system may create new job information for the UAV or user device.

Figure 9:
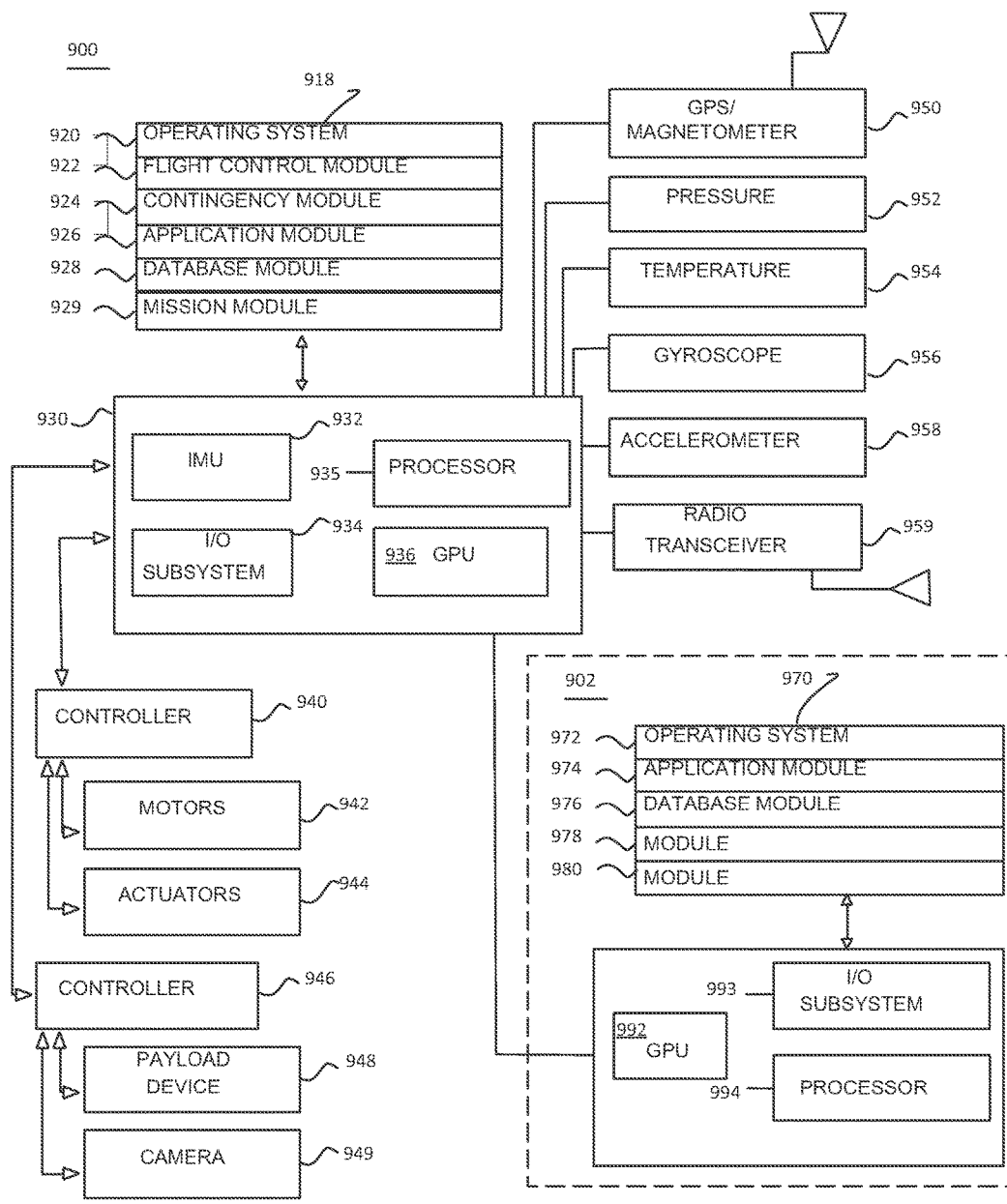
FIG. 9 illustrates a block diagram of an example flight control system architecture for a UAV.

FIG. 9 illustrates a block diagram of an example Unmanned Aerial Vehicle (UAV) architecture for implementing the features and processes described herein. A UAV primary processing system 900 can be a system of one or more computers, or software executing on a system of one or more computers, which is in communication with, or maintains, one or more databases. The UAV primary processing system 900 can be a system of one or more processors 935, graphics processors 936, I/O subsystem 934, logic circuits, analog circuits, associated volatile and/or non-volatile memory, associated input/output data ports, power ports, etc., and/or one or more software processing executing one or more processors or computers. The autopilot system 930 includes the IMU 932, processor 935, I/O subsystem 934, GPU 936, and various operating system 920, and modules 920-929. Memory 918 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GNSS receivers 950 (e.g., a GPS, GLONASS, Galileo, or Beidou system), gyroscopes 956, accelerometers 958, temperature sensors 954 pressure sensors (static or differential) 952, current sensors, voltage sensors, magnetometer, hydrometer, and motor sensors. The UAV may use an inertial measurement unit (IMU) 932 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 900 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module (also referred to as flight control engine) 922 handles flight control operations of the UAV. The module interacts with one or more controllers 940 that control operation of motors 942 and/or actuators 944. For example, the motors may be used for rotation of propellers, and the actuators may be used for flight surface control such as ailerons, rudders, flaps, landing gear, and parachute deployment.

The contingency module 924 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 929 processes the flight plan, waypoints, and other associated information with the flight plan. The mission module 929 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 949, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 918 of the UAV processing system 900.

The UAV processing system 900 may be coupled to various radios, and transmitters 959 for manual control of the UAV, and for wireless or wired data transmission to and from the UAV primary processing system 900, and optionally the UAV secondary processing system 902. The UAV may use one or more communications subsystems, such as a wireless communication or wired subsystem, to facilitate communication to and from the UAV. Wireless communication subsystems may include radio transceivers, and infra-red, optical ultrasonic, electromagnetic devices. Wired communication systems may include ports such as Ethernet, USB ports, serial ports, or other types of port to establish a wired connection to the UAV with other devices, such as a ground control system, cloud-based system, or other devices, for example a mobile phone, tablet, personal computer, display monitor, other network-enabled devices. The UAV may use a light-weight tethered wire to a ground control station for communication with the UAV. The tethered wire may be removeably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the cloud system.

Modules, programs or instructions for performing flight operations, contingency maneuvers, and other functions may be performed with the operating system. In some implementations, the operating system 920 can be a real time operating system (RTOS), UNIX, LINUX, OS X, WINDOWS, ANDROID or other operating system. Additionally, other software modules and applications may run on the operating system, such as a flight control module 922, contingency module 924, application module 926, and database module 928. Typically flight critical functions will be performed using the UAV processing system 900. Operating system 920 may include instructions for handling basic system services and for performing hardware dependent tasks.

In addition to the UAV primary processing system 900, a secondary processing system 902 may be used to run another operating system to perform other functions. A UAV secondary processing system 902 can be a system of one or more computers, or software executing on a system of one or more computers, which is in communication with, or maintains, one or more databases. The UAV secondary processing system 902 can be a system of one or more processors 994, graphics processors 992, I/O subsystem 993, logic circuits, analog circuits, associated volatile and/or non-volatile memory, associated input/output data ports, power ports, etc., and/or one or more software processing executing one or more processors or computers. Memory 970 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 902 will be non-critical functions in nature, that is if the function fails, the UAV will still be able to safely operate. In some implementations, the operating system 972 can be based on real time operating system (RTOS), UNIX, LINUX, OS X, WINDOWS, ANDROID or other operating system. Additionally, other software modules and applications may run on the operating system 972, such as an application module 974, database module 976, and so on (e.g., modules 978-980). Operating system 902 may include instructions for handling basic system services and for performing hardware dependent tasks.

Also, controllers 946 may be used to interact and operate a payload device 948, and other devices such as photographic camera 949, video camera, infra-red camera, multispectral camera, stereo camera pair, Lidar, radio transceiver, sonar, laser ranger, altimeter, TCAS (traffic collision avoidance system), ADS-B (Automatic dependent surveillance—broadcast) transponder. Optionally, the secondary processing system 902 may have coupled controllers to control payload devices.

For more details, see U.S. patent application Ser. No. 15/068,272, entitled "UNMANNED AERIAL VEHICLE ROOFTOP INSPECTION SYSTEM," filed on Mar. 11, 2016; U.S. patent application Ser. No. 15/068,327, entitled "UNMANNED AERIAL VEHICLE ROOFTOP INSPECTION SYSTEM," filed on Mar. 11, 2016; U.S. patent application Ser. No. 15/068,292, entitled "UNMANNED AERIAL VEHICLE ROOFTOP INSPECTION SYSTEM," filed on Mar. 11, 2016, each of which is incorporated by reference herein in its entirety.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A flight planning system comprising one or more processors, and a computer storage media storing instructions, that when executed by the one or more processors, cause the one or more processors to perform operations, wherein the operations are performed pre-flight of an unmanned aerial vehicle (UAV), and wherein the operations comprise:

receiving, via a user interface, a location for an aerial survey of a property to be conducted by an unmanned aerial vehicle (UAV);

displaying, via the user interface, one or more images depicting a view of the location;

accessing information describing a property boundary associated with the property;

determining a geofence boundary based on the accessed information describing the property boundary, wherein the geofence boundary represents a geospatial boundary in which to limit flight of the UAV;

determining a flight pattern for an area within the property boundary for inspection by the UAV, the flight pattern having flight waypoints, each flight waypoint indicating a location where the UAV will obtain sensor information describing the location;

determining a flight plan having a take-off location, a landing location, and the flight pattern, wherein the take-off location, the landing location and the flight pattern are set within the geofence boundary, wherein the user interface is configured to receive modifications to one or more of the take-off location, landing location, or flight pattern; and generating a flight data package, including the flight plan, for use by the UAV for navigation during the aerial survey.

2. The flight planning system of claim 1, wherein the take-off location is determined to be located in an area identified, by the flight planning system, as clear of obstructions.

3. The flight planning system of claim 1, wherein the operations further comprise:

identifying, using image analysis of the one or more images, one or more features included in the images that are indicative of a suitable location for a take off location, and designating a particular suitable location as the take off location.

4. The flight planning system of claim 3, wherein a suitable location includes a sidewalk, driveway, or roadway.

5. The flight planning system of claim 1, wherein the operations further comprise:

identifying, using image analysis of the one or more images, one or more features included in the images that are indicative of a non-suitable location for a take off location, and preventing the launch location to be designated as a non-suitable location.

6. The flight planning system of claim 5, wherein a non-suitable location includes a tree, pool, or a location within a threshold distance of a power line.

7. The flight planning system of claim 5, wherein preventing the take-off location to be designated as a non suitable location comprises:

receiving, via the user interface, input specifying a selection of a location in the one or more images to be designated as a take off location;

determining, that the selected location is a non suitable location; and providing, for presentation in the user interface, information specifying that the selected location cannot be selected.

8. The flight planning system of claim 1, wherein the operations further comprise determining, based at least in part on colors or hue of a first object depicted in the one or more images, that a location of the first object in the images is a take-off location.

9. The flight planning system of claim 8, wherein the first object is determined to be a drive way based at least in part on the first object being depicted as substantially gray.

10. The flight planning system of claim 1, wherein the operations further comprise:

detecting one or more building footprints of the property using image analysis of the one or more images, and determining the flight waypoints using the detected building footprints.

11. A non-transitory computer storage medium comprising instructions that when executed by a system of one or more computers, cause the system to perform operations, wherein the operations are performed pre-flight of an unmanned aerial vehicle (UAV), and wherein the operations comprise:

receiving, via a user interface, a location for an aerial survey of a property to be conducted by an unmanned aerial vehicle (UAV);

displaying, via the user interface, one or more images depicting a view of the location;

accessing information describing a property boundary associated with the property;

determining a geofence boundary based on the accessed information describing the property boundary, wherein the geofence boundary represents a geospatial boundary in which to limit flight of the UAV;

determining a flight pattern for an area within the property boundary for inspection by the UAV, the flight pattern having flight waypoints, each flight waypoint indicating a location where the UAV will obtain sensor information describing the location;

determining a flight plan having a take-off location, a landing location, and the flight pattern, wherein the take-off location, the landing location and the flight pattern are set within the geofence boundary, wherein the user interface is configured to receive modifications to one or more of the take-off location, landing location, or flight pattern; and generating a flight data package, including the flight plan, for use by the UAV for navigation during the aerial survey.

12. The computer storage medium of claim 11, wherein the take-off location is determined to be located in an area identified, by the flight planning system, as clear of obstructions.

13. The computer storage medium of claim 11, wherein the operations further comprise:

identifying, using image analysis of the one or more images, one or more features included in the images that are indicative of a suitable location for a take off location, and designating a particular suitable location as the take off location.

14. The computer storage medium of claim 13, wherein a suitable location includes a sidewalk, driveway, or roadway.

15. The computer storage medium of claim 11, wherein the operations further comprise:

identifying, using image analysis of the one or more images, one or more features included in the images that are indicative of a non-suitable location for a take off location, and preventing the launch location to be designated as a non-suitable location.

16. The computer storage medium of claim 15, wherein a non-suitable location includes a tree, pool, or a location within a threshold distance of a power line.

17. The computer storage medium of claim 15, wherein preventing the take-off location to be designated as a non suitable location comprises:

receiving, via the user interface, input specifying a selection of a location in the one or more images to be designated as a take off location;

determining, that the selected location is a non suitable location; and providing, for presentation in the user interface, information specifying that the selected location cannot be selected.

18. The computer storage medium of claim 11, wherein the operations further comprise determining, based at least in part on colors or hue of a first object depicted in the one or more images, that a location of the first object in the images is a take-off location.

19. The computer storage medium of claim 18, wherein the first object is determined to be a drive way based at least in part on the first object being depicted as substantially gray.

20. The computer storage medium of claim 11, wherein the operations further comprise:

detecting one or more building footprints of the property using image analysis of the one or more images, and determining the flight waypoints using the detected building footprints.

21. A computerized method performed by a system of one or more computers, the method being performed pre-flight of an unmanned aerial vehicle (UAV), wherein the method comprises:

receiving, via a user interface, a location for an aerial survey of a property to be conducted by an unmanned aerial vehicle (UAV);

displaying, via the user interface, one or more images depicting a view of the location;

accessing information describing a property boundary associated with the property;

determining a geofence boundary based on the accessed information describing the property boundary, wherein the geofence boundary represents a geospatial boundary in which to limit flight of the UAV;

determining a flight pattern for an area within the property boundary for inspection by the UAV, the flight pattern having flight waypoints, each flight waypoint indicating a location where the UAV will obtain sensor information describing the location;

determining a flight plan having a take-off location, a landing location, and the flight pattern, wherein the take-off location, the landing location and the flight pattern are set within the geofence boundary, wherein the user interface is configured to receive modifications to one or more of the take-off location, landing location, or flight pattern; and generating a flight data package, including the flight plan, for use by the UAV for navigation during the aerial survey.

22. The computerized method of claim 21 further comprising:

identifying, using image analysis of the one or more images, one or more features included in the images that are indicative of a suitable location for a take off location, and designating a particular suitable location as the take off location.

23. The computerized method of claim 22, wherein a suitable location includes a sidewalk, driveway, or roadway.

24. The computerized method of claim 21 further comprising:

identifying, using image analysis of the one or more images, one or more features included in the images that are indicative of a non-suitable location for a take off location, and preventing the launch location to be designated as a non-suitable location.

25. The computerized method of claim 24, wherein a non-suitable location includes a tree, pool, or a location within a threshold distance of a power line.

26. The computerized method of claim 24, wherein preventing the take-off location to be designated as a non suitable location comprises:

receiving, via the user interface, input specifying a selection of a location in the one or more images to be designated as a take off location;

determining, that the selected location is a non suitable location; and providing, for presentation in the user interface, information specifying that the selected location cannot be selected.

27. The computerized method of claim 21 further comprising determining, based at least in part on colors or hue of a first object depicted in the one or more images, that a location of the first object in the images is a take-off location.

28. The computerized method of claim 27, wherein the first object is determined to be a drive way based at least in part on the first object being depicted as substantially gray.

29. The computerized method of claim 21 further comprising:

detecting one or more building footprints of the property using image analysis of the one or more images, and determining the flight waypoints using the detected building footprints.

30. The computerized method of claim 21, wherein subsequent to determination of the geofence boundary, the geofence boundary is fixed during the aerial survey such that the geofence boundary is not modifiable in the user interface.

* * * * *